US005819020A

United States Patent [19]
Beeler, Jr.

[11] Patent Number: 5,819,020
[45] Date of Patent: Oct. 6, 1998

[54] REAL TIME BACKUP SYSTEM

[75] Inventor: Donald E. Beeler, Jr., Monroe, N.Y.

[73] Assignee: Network Specialists, Inc., Hoboken, N.J.

[21] Appl. No.: 543,266

[22] Filed: Oct. 16, 1995

[51] Int. Cl.[6] ................................. G06F 17/30
[52] U.S. Cl. ..................... 395/182.03; 707/204
[58] Field of Search .............. 395/182.01, 182.02, 395/182.03, 182.04, 182.05, 182.06, 182.07, 182.08, 182.09, 200.01, 200.02, 200.03, 200.04, 200.05, 200.06, 200.07, 200.08, 200.09, 618, 620

[56] References Cited

U.S. PATENT DOCUMENTS

| | | | |
|---|---|---|---|
| 5,086,502 | 2/1992 | Malcolm | 395/575 |
| 5,241,672 | 8/1993 | Slomcenski et al. | 395/618 |
| 5,263,152 | 11/1993 | Smith et al. | 395/182.03 |
| 5,513,314 | 4/1996 | Kandasamy et al. | 395/182.04 |
| 5,537,533 | 7/1996 | Staheli et al. | 395/182.03 |
| 5,555,371 | 9/1996 | Duyanovich et al. | 395/182.11 |
| 5,564,011 | 10/1996 | Yammine et al. | 395/182.13 |
| 5,592,611 | 1/1997 | Midgely et al. | 395/182.02 |
| 5,594,900 | 1/1997 | Cohn et al. | 395/600 |
| 5,596,706 | 1/1997 | Shimazaki et al. | 395/182.04 |
| 5,600,784 | 2/1997 | Bissett et al. | 395/182.1 |
| 5,604,862 | 2/1997 | Midgely et al. | 395/182.04 |
| 5,608,865 | 3/1997 | Midgely et al. | 395/180 |
| 5,611,049 | 3/1997 | Pitts | 395/200.09 |
| 5,615,364 | 3/1997 | Marks | 395/618 |
| 5,633,999 | 5/1997 | Clowes et al. | 395/182.04 |
| 5,634,052 | 5/1997 | Morris | 395/601 |

*Primary Examiner*—Thomas G. Black
*Assistant Examiner*—Buay Lian Ho
*Attorney, Agent, or Firm*—Chadbourne & Parke LLP

[57] ABSTRACT

In a computer network system, a user-defined file modification request is communicated to a primary server, which communicates the request to a secondary server. The file modification request is saved in a non-volatile storage media associated with the primary server, and the file modification request is executed and saved in a non-volatile storage media associated with the secondary server.

35 Claims, 35 Drawing Sheets

REAL TIME BACKUP SYSTEM

BACKGROUND OF THE INVENTION

The present invention relates generally to the field of data replication techniques for computer operating systems, and in particular, to an apparatus and method providing real-time back-up of data changes occurring in open or newly edited files .

A network is a collection of computers connected to each other by various means, in order to share programs, data, and peripherals among computer users. Data on such systems should be periodically copied to a secondary "backup" media, for numerous reasons; including computer failure or power shortage that may damage or destroy some or all of the data stored on the system.

The standard approach to backing up data is to perform "full backups" of files on the system on a periodic basis. This means copying the data stored on a given computer to a backup storage device. A backup storage device usually, but not always, supports removable high-capacity media (such as Digital Audio Tape or Streaming Tape). Between full backups, incremental backups are performed by copying only the files that have changed since the last backup (full or incremental) to a backup storage device. This reduces the amount of backup storage space required, as files that have not changed will not be copied on each incremental backup. Incremental backups also provide an up-to-date backup of the files, when used in conjunction with the full backup. There are several commercial software products available to facilitate such backup operations, such as Cheyenne's ARCServe, Palindrome's Backup Director, Symantec's Norton Enterprise Backup, Legato's NetWorker for NetWare, and Arcada's Backup Exec for NetWare.

The problem with this technique is that the data stored to the backup media is only valid at the exact time the backup is performed. Any changes made after one incremental backup, but before the next, would be lost if there was a failure on the file storage media associated with the computer. Moreover, since the backup process on a large system can take several hours or days to complete, files backed up to the beginning of a tape may have been modified by the time the backup completes.

Another disadvantage of this approach is that with most systems, all files to be copied to backup storage media must be closed before a backup can be performed, which means that all network users must log off the system during the backup process. If files remain open during the backup process, the integrity of the backup data is jeopardized. On a network with hundreds or thousands of users, this can be a time-consuming process. In organizations that require full-time operation of a computer network, this approach is not feasible.

To address the problem of backing up open files, techniques have been developed to ensure that no changes are made to a file while it is being backed up. One product that utilizes such an approach is the St. Bernard Open File Manager, licensed by Emerald Systems Corporation. While a file is being copied to backup storage media, the original contents of the data to be overwritten are stored in a "pre-image cache", which is a disk file allocated specifically for this product. Reads from a backup program are redirected to the pre-image cache if the requested data has been overwritten. Otherwise, the backup read is directed to the original file on disk. Related files on a disk can be "grouped", so that changes to all files in the group are cached using the technique described above, whenever any one file in the group is being backed up. One problem with this approach is that the resulting backup is still only valid until a change is made to any one of the files on the system.

More recently, several approaches have been developed to backup the data on a computer system in real-time, meaning the data is backed up whenever it is changed. In such known methods, a full backup of the primary storage media is made to a backup media, then incremental backups of changed data is made whenever a change is made to the primary storage media. Since changes are written immediately to the backup media, the backup media always has an updated copy of the data on the primary media. A second hard disk (or other non-volatile storage media) that is comparable in size and configuration is required for this method.

One such approach is to perform "disk mirroring", such as is available on Server Fault Tolerance (SFI) II from Novell. In this approach, a full backup of a disk is made to a second disk attached to the same central processing unit. Whenever changes are made to the first disk, they are mirrored on the second disk. This approach provides a "hot-backup" of the first disk, meaning that if a failure occurs on the first disk, processing can be switched to the second with little or no interruption of service. A disadvantage of this approach is that a separate hard disk is required for each disk to be backed up, doubling the disk requirements for a system. The secondary disk must be at least as large as the primary disk, and the disks must be configured with identical volume mapping. Any extra space on the secondary disk is unavailable. Also, in many cases errors that render the primary disk inoperable affect the mirrored disk as well.

SFT III from Novell introduced the capability to mirror transactions across a network. All disk I/O and memory operations are forwarded from a file server to a target server, where they are performed in parallel on each server. This includes reads as well as writes. If a failure occurs on the source server, operation can be shifted to the target server. Both the source and target servers must be running Novell software in this backup configuration, and a proprietary high-speed link is recommended to connect the two servers. As NetWare is a multi-tasking environment, the target server can be used for other limited functions while mirroring is being performed. A disadvantage of this approach is that since all operations are mirrored to both servers, errors on the primary server are often mirrored to the secondary server. As with SFTII, local storage on both the source and target servers must be similarly configured.

Standby Server by VINCA uses the network mirroring capability of NetWare, and provides a mechanism to quickly switch from the source server to the target server in the event of a failure. VINCA's Standby Server 32 with Autoswitch, adds automatic switching between servers on failure, and allows the operator to take advantage of NetWare's 32-bit environment. Communication between the source and target servers is accomplished via a dedicated, proprietary interface. While the source and target server do not have to be identical, identical partitions are required on the local file system of each server.

Most disaster recovery procedures require that a periodic backup of the system be stored "offsite", at a location other than where the network is being operated. This protects the backup data in the event of a fire or other natural disaster at the primary operating location, in which all data and computing facilities are destroyed. Baseline and incremental techniques can be used to perform such a backup to removable media, as described above. A disadvantage of the "mirroring" approaches to real-time backup is that the target server or disk cannot be backed up reliably while mirroring is being performed. If a file is open on the target server or disk, as a result of a mirroring operation, it can not be backed up to a separate backup storage device. The result of this limitation is that all users have to be logged off of the system before such a backup can take place.

These foregoing approaches introduce some degree of fault-tolerance to the computer system, since a failure on the primary storage media or computer can be tolerated by switching to the secondary storage media or computer. A disadvantage common to all of these techniques is that there is a one-to-one relationship between the primary and secondary storage media, thereby doubling the hardware resources required to implement mirroring. Even if only a small number of data files on a server are considered critical enough to require real-time replication, a separate, equivalent copy of the server or hard disk is still necessary. If critical files exist on several computers throughout the network, mirroring mechanisms must be maintained at each computer. None of these approaches provides a method for mirroring between multiple computers.

In many network configurations, there are many different types of computers connected as workstations and file servers. In many cases, different operating systems are used on different nodes on the same network. Some examples are: Novell Netware (Versions 3.x,4.x); Windows NT; Unix (System V, BSD); and OS/2. When centralized backup of the various servers is required, files from each of the servers must be copied over the network to a centralized backup server, where they can be stored to a backup storage device. None of the existing real-time backup systems provide the capability to back up data between servers that are running different operating system software.

SUMMARY OF THE INVENTION

The purpose of this invention is to provide means for real-time, transaction-based replication of one or more source computers on a network to one or more target computers, which may or may not be running the same operating system software as the original source computer. This provides centralized backup facilities across an entire network, coordination of distributed processing, and migration of data to a new platform with minimal downtime. Only changed information is transmitted to the target server, minimizing the amount of network traffic associated with such a backup. A method of controlling flow between the source and target servers is provided to avoid loss of data and bottlenecks in the path between the servers. Means are provided to allow files currently open and in use by an application to be backed up in real-time. Finally, means are provided to replicate user configuration information (such as user accounts, file ownership, and trustee rights) to the target computer, so that users may login immediately and access data in the event of a failure on the source computer.

A feature of the invention is the manner in which information on a computer system is replicated to a secondary storage media in real-time. Specifically, when a change is made to a file or configuration item on the primary (source) computer, those changes are immediately copied to a secondary (target) computer. This provides a real-time backup of all data on the source computer, so no data is lost in the event of a source computer failure. Only data that has been changed on the source computer is transmitted to the target computer for replication, versus transmitting the entire contents of the file. This reduces the amount of network traffic required to attain real-time replication.

A further feature of this invention is the manner in which information on the source computer is replicated to the target computer regardless of which software application modifies the information. This includes applications running on the source computer, as well as applications running on other computers that have access to the data on the source computer via networking means.

A further feature of this invention is the means in which several source computers can be replicated to the same target computer. The file system associated with each source computer can be replicated to a separate subdirectory on the target computer storage media, as specified by the operator when configuring the invention. Many servers can be replicated to a single target server. User configuration information from each source computer is replicated to the target computer, so that this information can be restored to the proper source computer in the event of a failure.

A further feature of this invention is the means in which a single source computer can be replicated to several different target computers. Each replication packet is sent from the source computer to the each of the target computers, as designated by user configuration of the invention. The result of this operation is that each target computer has a copy of the source files, updated in realtime. This feature allows for data processing to be distributed to different computers, by handling the coordination of changes between all targets.

Another feature of this invention is that data can be replicated to a local file system on the source computer. This configuration is referred to as single-server mode, as only a single computer is required to perform replication. Replicated data is stored in a separate directory on the source computer, as specified by the operator. This mode is useful when resources are not available for a separate source and target computer, or when a network connection to a target server can not be made.

Another feature of this invention is the means in which data can be replicated to target computer(s) running a different operating system than the source computer(s). The format of replication messages passed between the source and target computers is common for all operating systems. Independent means are provided to build such messages from operating specific commands on the source computer, and to interpret these messages into operating specific commands on the target computer. This feature allows data to be shared between applications running on different platforms.

A further feature of this invention is manner in which the operator may select a commit mode for replication actions. Commit mode refers to the conditions that must be met before a replication is considered to be successful, thereby allowing the original file operation to proceed. By default, the target computer must return a successful status message to the source computer before the transaction is committed. In real mode, the transaction is committed as soon as the replication packet is transmitted from the source computer. In local mode, the transaction is committed as soon as the replication command is written to a local disk file. In remote mode, the file operation must be successful on both the source and target computers, before the transaction is committed. If the operation fails on either computer, both operations are reversed to return each computer to original state.

A further feature of this invention is the method in which flow of replication data between the source and target computers is controlled. Means are provided to control replication data flow by limiting the number of replication network packets that can be in transmission at any one time. Once this limit is reached, additional packets are placed on a packet queue until the number of outstanding packets falls below the prescribed level. Also, if there are not enough network resources to accommodate all of the outstanding packets in the queue, the commands are placed in a second internal queue in a compressed format. This format includes the file name, offset, and length of data to be changed, but not the actual data to be modified in the file. When network resources are again available to service these requests, the required data associated with each command is extracted from the file on the source server, and a network packet is built and placed on the packet queue.

Another feature of this invention is the manner in which multiple operations to the same file are handled on the internal queue described above. The condition described above, in which commands are placed on an internal queue because of a lack of network resources, is referred to as stacked-up mode. In stacked-up mode, several commands may be received in the queue that are associated with the same file. If the commands reference similar areas in the file, the commands will be merged in to a single command denoting the union of the two areas. If the commands reference areas within the file that are sufficiently separated, the commands will not be merged in the queue. This technique reduces the number of replication packets required when network resources are again available, and reduces the size of the internal queue.

Another feature of this invention is the means for the user to configure flow control rules, in order to maximize network efficiency based on the current hardware configuration. The operator can define if packets are to held in queue on the source computer until certain conditions exist, or to send out all packets immediately upon receiving them. This feature can be used to optimize network performance and cost when using communication protocols such as ISDN or X.25, or when replication is done across a Wide Area Network (WAN).

Another feature of this invention is that the operator may select individual files, subdirectories, directories, volumes, or file systems on the source computer to replicate. Means are provided for the user to select files to be replicated by file name, location, or type. A database of files to be replicated is maintained on the source computer. This feature allows the user to mirror only those files on a computer that are considered to be critical enough to require real-time replication.

Another feature of this invention is the manner in which source computer data is initially mirrored to the target computer. Once a source/target computer configuration is established, the user may initiate the mirroring process which copies all of the files on the source computer to the target computer. The location of replicated files on the target computer is specified by the operator during configuration. The mirroring process utilizes the flow control and compression techniques described above for normal replication operations. If replication is disabled at any time during operation, the operator may choose to remirror all data to the target server. This insures that all files on the source and target computers are in sync after a disruption in service.

Another feature of this invention is the manner in which data is restored from the target server to the source server in the event of a source server failure. Means are provided to copy all of the replicated data back to the source server using the mirroring technique described above. All user configuration information (including user accounts, file ownership, trustee rights) is also rebuilt on the source server, using the replicated target server information. Since all replicated data is stored on the target server in standard file format, it can be copied back to the source server at any time via user requests.

Another feature of this invention is the ability for a user to login to the target server and access all replicated data in the event of a source server failure. Since all user configuration information (such as user accounts, file ownership, trustee rights) are replicated on the target computer, the user can login at any time with the same access rights as on the source computer. The target computer serves as a hot backup to the source computer, which reduces the amount of user downtime in the event of a computer failure.

Another feature of this invention is the manner in which data can be copied to a backup storage media on the target computer, while users have the file open on the source computer. For each data replication packet received by the target computer, the associated file is opened, data is written, and the file is then closed, even if the file remains open on the source computer. The result of this sequence is that files are closed and available for backup using third-party backup utilities.

Another feature of this invention is the ability to store replicated data to a backup storage device (such as a streaming tape) from the target computer, providing a common backup server for one or more source computers. This feature also reduces the processor loading on the source computers, as the backup function is not performed locally.

Another feature of this invention is the means in which replication commands can be held in memory or on disk while data on the target computer is accessed. An application may make a call via an Application Program Interface (API) to cause all replication commands to be placed in the source server internal queue, instead of being sent to the target computer for replication. Another call can be made to resume replication, causing all commands in the queue to be sent to the target computer in the order they were received. The queuing techniques described above are used to maintain this queue on the source server. This technique can be used by applications such as backup agents, which require a constant file image during processing.

Another feature of this invention is the ability to replicate over a Wide Area Network (WAN), without any specialized or proprietary hardware. Existing WAN communication mechanisms can be used to transmit replication packets to target computers. This feature allows remote sites to maintain real-time updates on data files, and also provides a mechanism for effecting off-site backup storage of critical data.

Another feature of this invention is the means by which to maintain copies of deleted files on the target computer, and to restore these files to the source server if requested by the user. Based on user configuration, copies of deleted files may be stored under unique names on the target server. Means are provided to display all such files to the user, and to allow the user to restore one or more of these files to a specific location on the source computer. This feature can be configured to maintain deleted files on the target computer until they are explicitly purged by the user, or after a certain period of inactivity.

Another feature of this invention is the mechanism by which large files are mirrored to an existing directory on the target computer. If the specified file exists on both the source and target computers when mirroring is initiated, only those blocks that have changed shall be copied to the target computer. This feature is only used when the specified file is large enough such that the transmission cost of sending the entire file is greater than the cost of determining which blocks have changed between the files on each computer. This reduces the amount of network traffic required to bring source and target computers in to sync, in the event replication is disabled for any period of time.

Another feature of this invention is the means by which files that are inactive for a specified period of time can be archived to the target computer and deleted from the source computer, in order to conserve storage media. For each file or group of files to be archived, the user may configure the amount of inactivity required before the file is deleted from the source computer. Means are also provided to list all such files on the target server, and to allow the user to restore such files to the source computer if necessary.

Another feature of this invention is the means by which replication transactions may be stored to a local storage media on the source computer, in the event that the source computer can not connect to the target computer. All transactions are stored locally using the internal queuing techniques described above. Once a connection is reestablished with the target computer, all stored transactions can be transmitted and executed in the order they were received.

Another feature of this invention is the means by which replication data may be compressed prior to transmission, in order to reduce the amount of network traffic. This feature can be configured by the user to compress data being sent from the source computer, using a variety of standard compression algorithms. Compressed data is decompressed by the target computer, before the data is written to storage media.

Another feature of this invention is the means by which replication data may be encrypted prior to transmission, in order to prevent replicated data from being intercepted and compromised. This feature can be configured by the user to encrypt data being sent from the source computer, using a variety of standard encryption algorithms. Encrypted data is authenticated by the target computer, before the data is written to storage media.

Another feature of this invention is the manner in which all replication operations are done at the file system level, via operating system calls. Direct access to storage media on either the source or target computers is not required, thereby reducing the risk of introducing errors during low-level media access.

DETAILED DESCRIPTION OF THE PREFERRED EMBODIMENTS OF THE INVENTION

Figure 1:
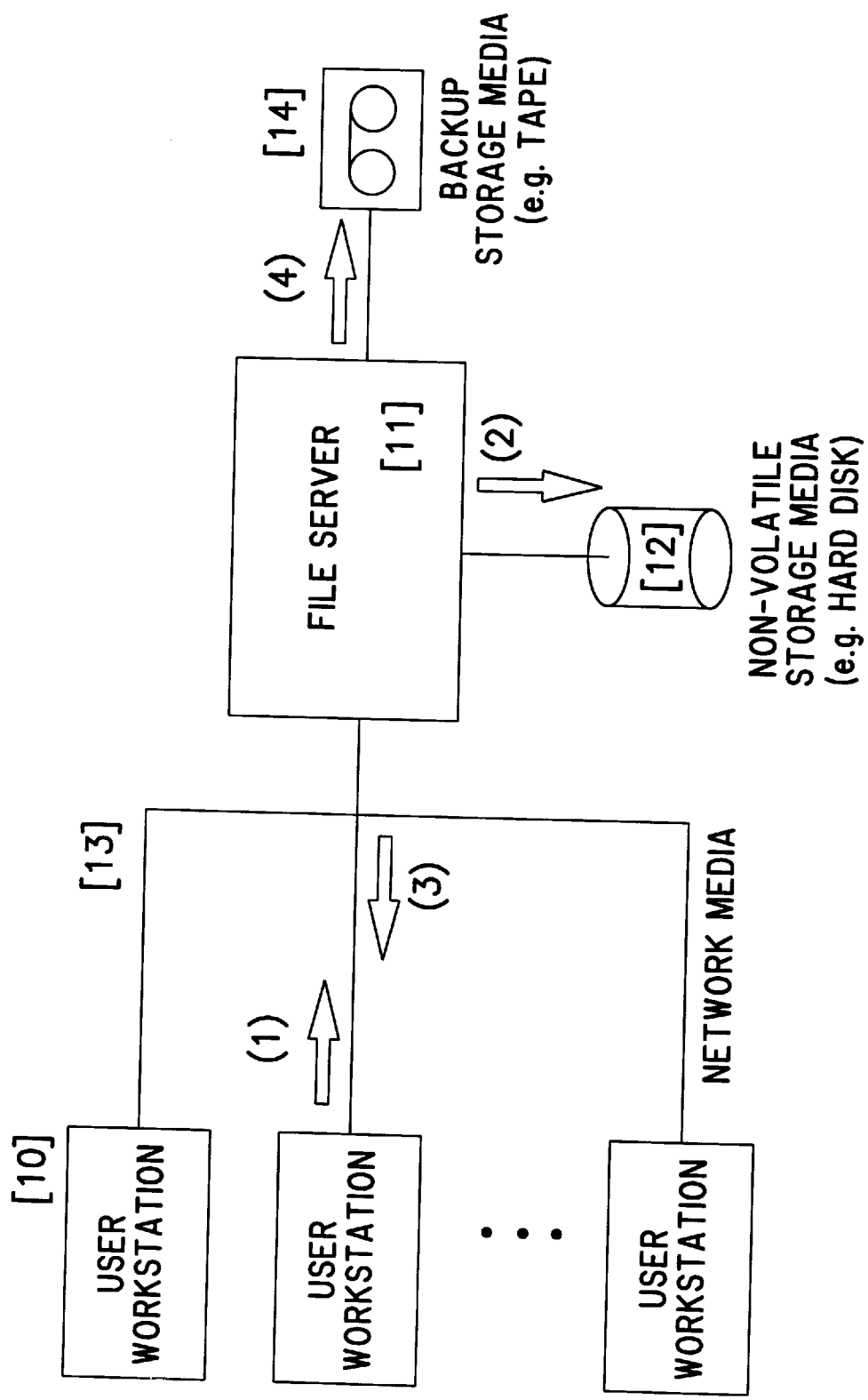
FIG. 1 is a block diagram of a typical computer network configuration.
Figure 2:
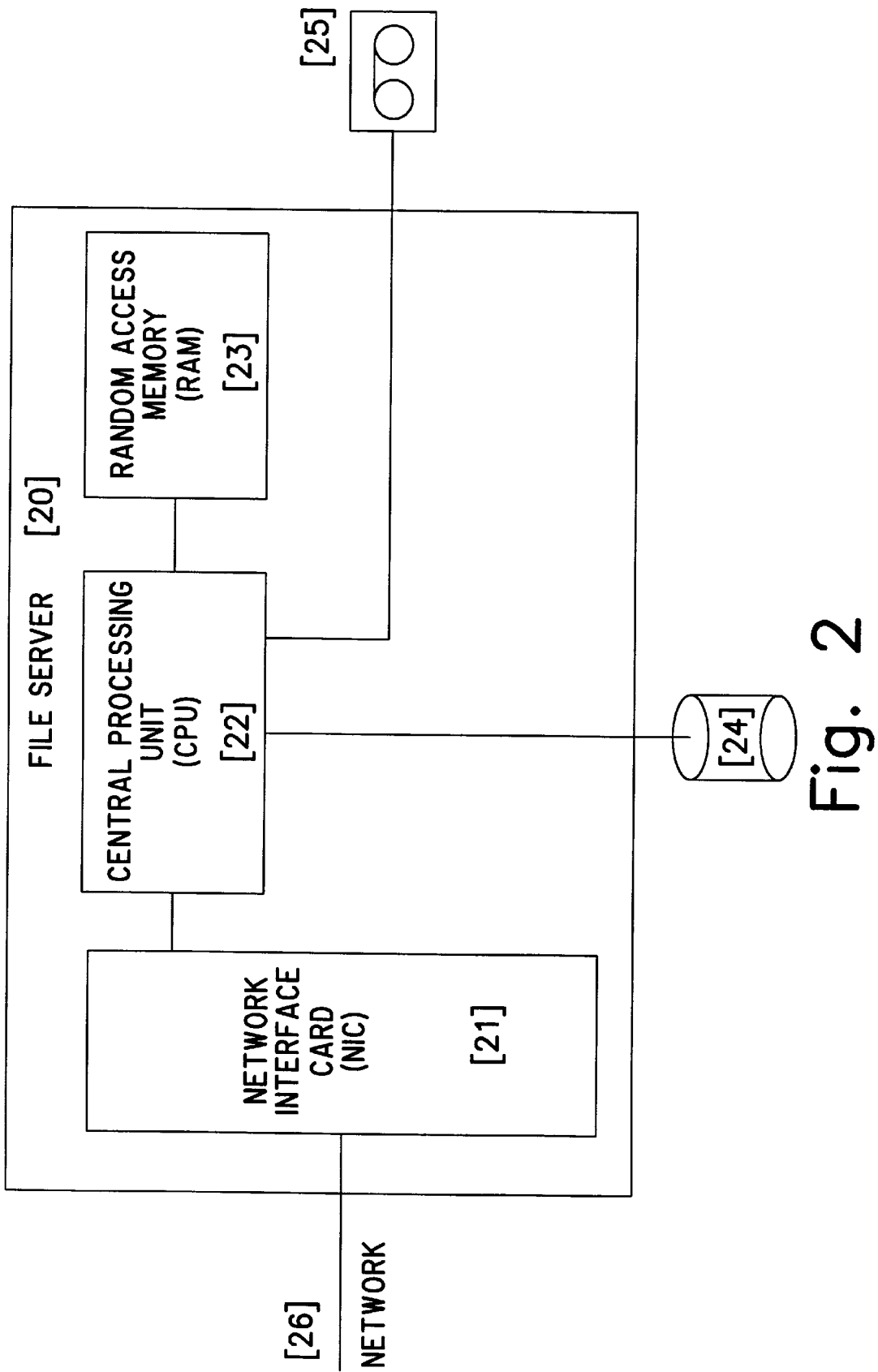
FIG. 2 is a block diagram of the major components of a typical file server.

FIG. 1 represents a typical computer network configuration, consisting of file server [11] with local non-volatile storage [12], one or more user workstations [10], and local area network (LAN) [13]. The file server [11] and workstations [10] are not necessarily all the same type of computer, and may be running unique operating system software on each. A backup device [14], such as a tape drive [11] is also connected directly to file server [11]. The major components of a file server [11] are shown in FIG. 2, and include central processing unit ("CPU") [22], random access memory (RAM) [23], non-volatile data storage (such as a hard disk drive) [24], and a network interface card (NIC) [21].

Typical operation of this sample computer network system is shown by the numbered arrows in FIG. 1. Workstations [10] send file modification requests (1) to the file server [11], which processes the request and stores any required changes to non-volatile storage media [12] connected thereto through operating system calls (2). At any given time, the contents of hard disk [12] can be stored to back-up storage media [14] for backup purposes (4). If an error occurs on file server [11] which destroys some or all of the data on non-volatile storage media [12], the contents of the backup tape can be restored from backup storage media [14] non-volatile storage media [12].

Figure 3:
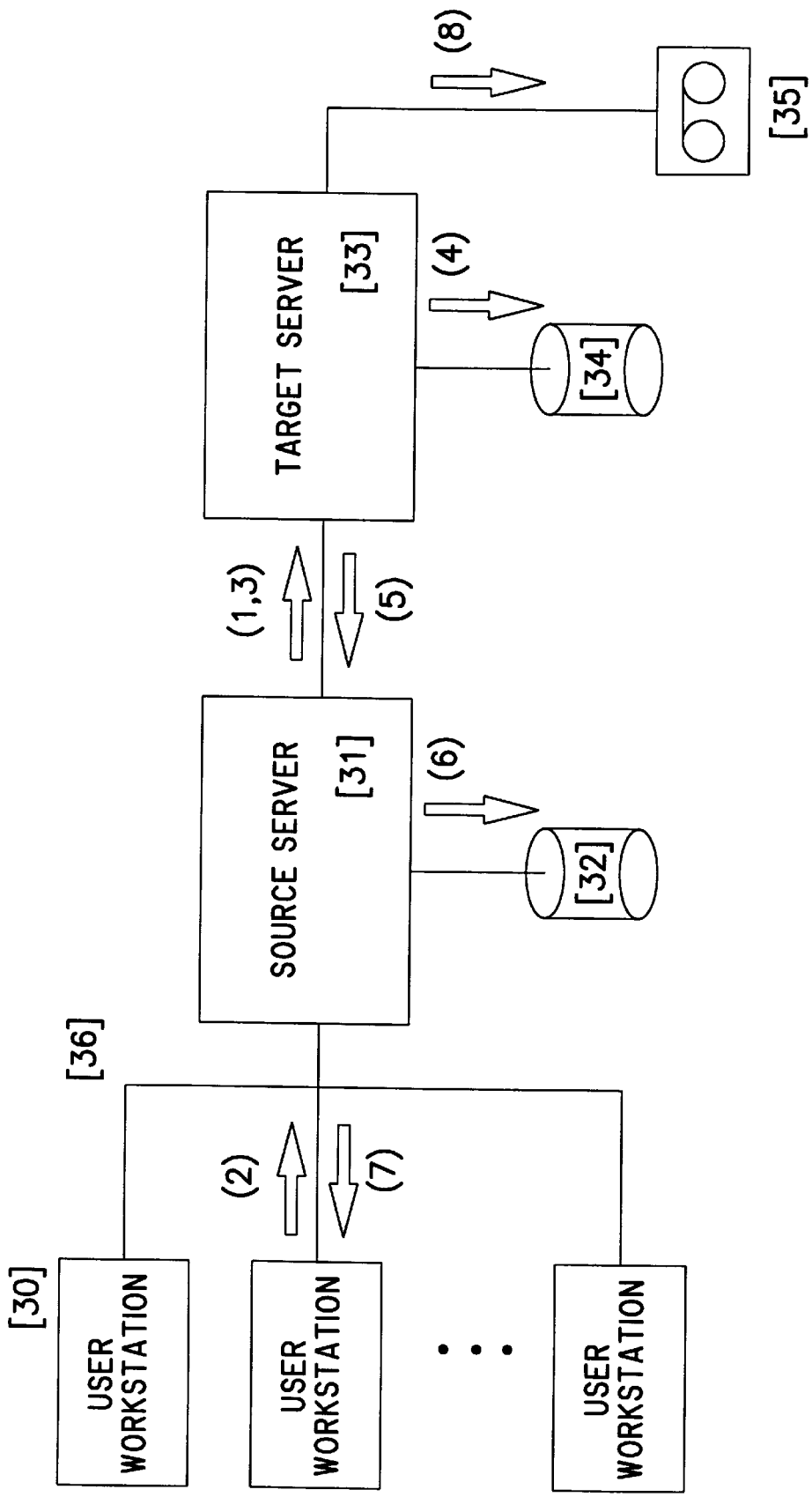
FIG. 3 is a block diagram of a computer network system configured for server replication in accordance with the invention.

FIG. 3 shows a typical computer network system configured for server replication, in accordance with the preferred embodiment of this invention. This configuration consists of source (or primary) server [31], a target (or secondary) server [33], one or more client workstations [30], and a local area network ("LAN") [36] to connect servers and workstations. A backup device [35] such as a tape drive, is also connected directly to the target server [33]. All communication between work stations [30], source server [31], and target server [33] is done via LAN [36] One skilled in the art will appreciate that the LAN utilizes standard networking mechanisms (e.g. ethernet, token-ring), and this configuration may be partitioned in to separate network segments to improve performance.

The sequence of operations of the preferred embodiment is shown by the numbered arrows in FIG. 3. In step 1 (1), the contents of hard disk [32] in the source server [31] is mirrored to hard disk [34] on target server [33], via network packets. Workstations [30] then send file modification requests (2) to source server [31]. The source server [31] forwards these requests to target server [33] for replication (3). The target server [33] executes the file modification request (4) on its local hard disk [34], then returns a status message (5) to source server [31]. The source server [31] then executes the file modification request on its local hard disk [32] (7) then returns a status message to the workstation [30]. It is an option for the contents of hard disk [34] to be forwarded and saved on tape [35]. The result of these operations is that hard disks [32,34] on source server [31] and target server [33] have current copies of same files at all times. Other embodiments of this invention do not require target server [33] to execute the file modification request on hard disk before source server [31] executes the file modification request on its disk drive[32].

Figure 4:
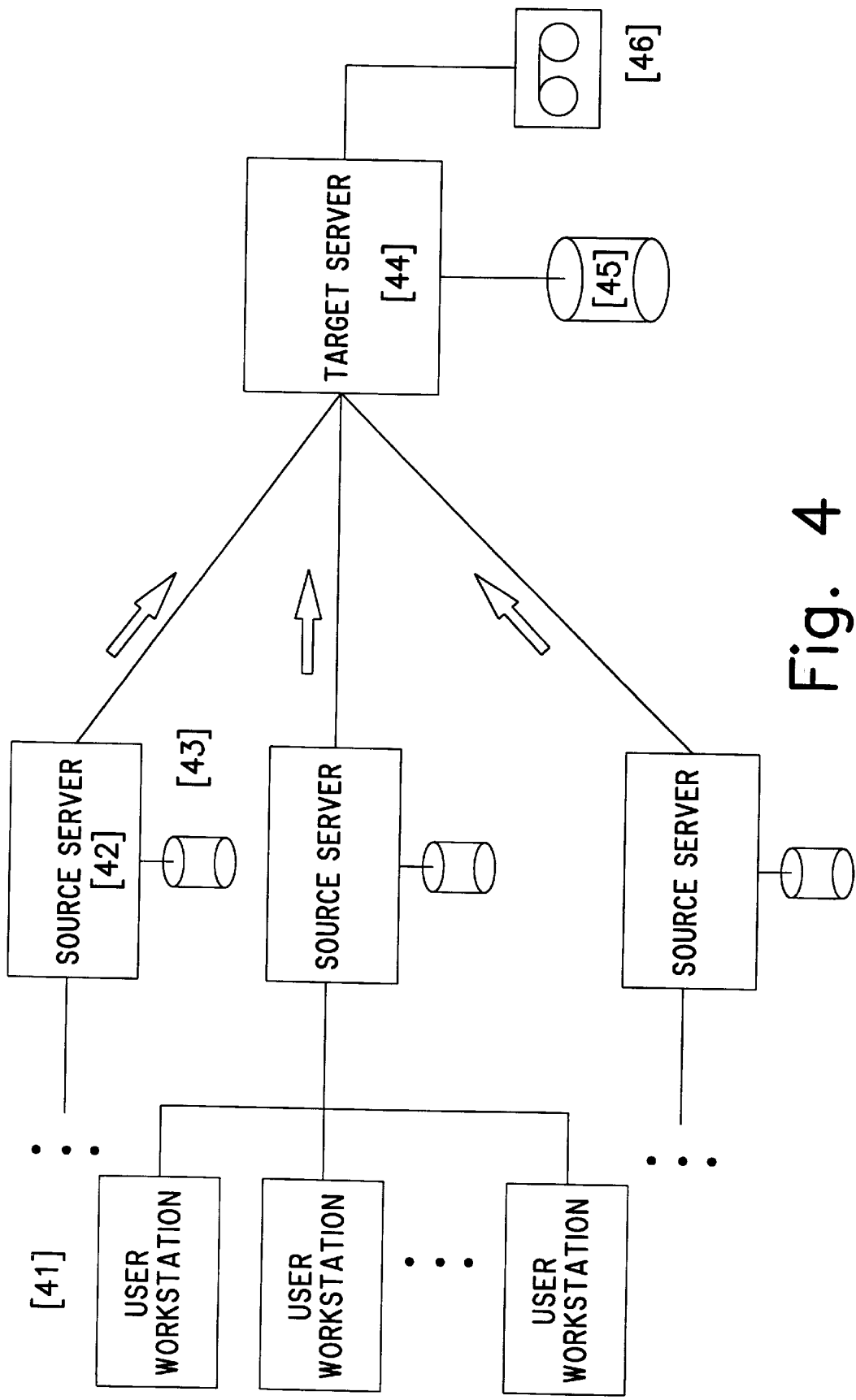
FIG. 4 is a block diagram of a computer network in Many to One replication configuration.
Figure 5:
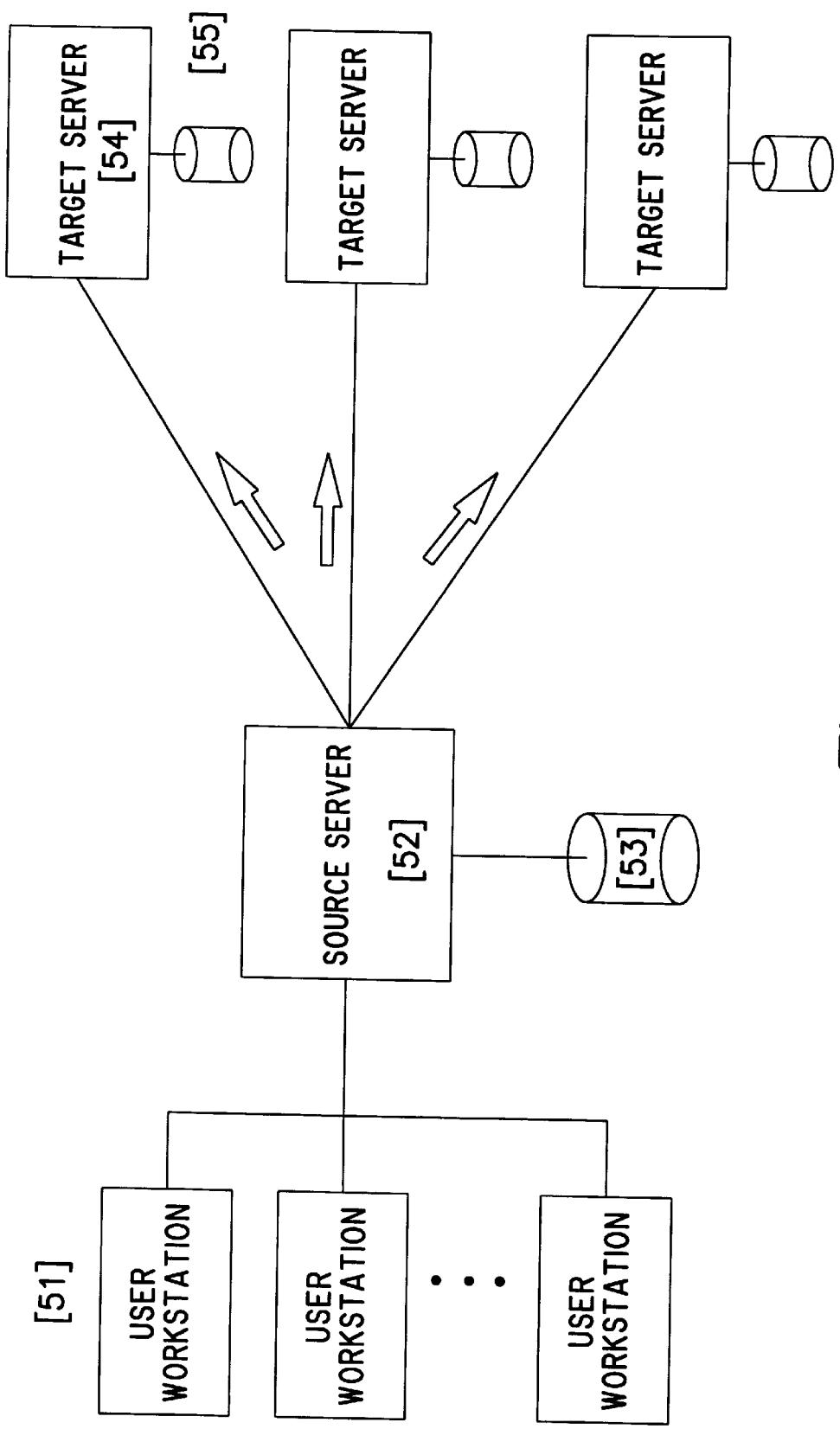
FIG. 5 is a block diagram of a computer network in One to Many replication configuration.
Figure 6:
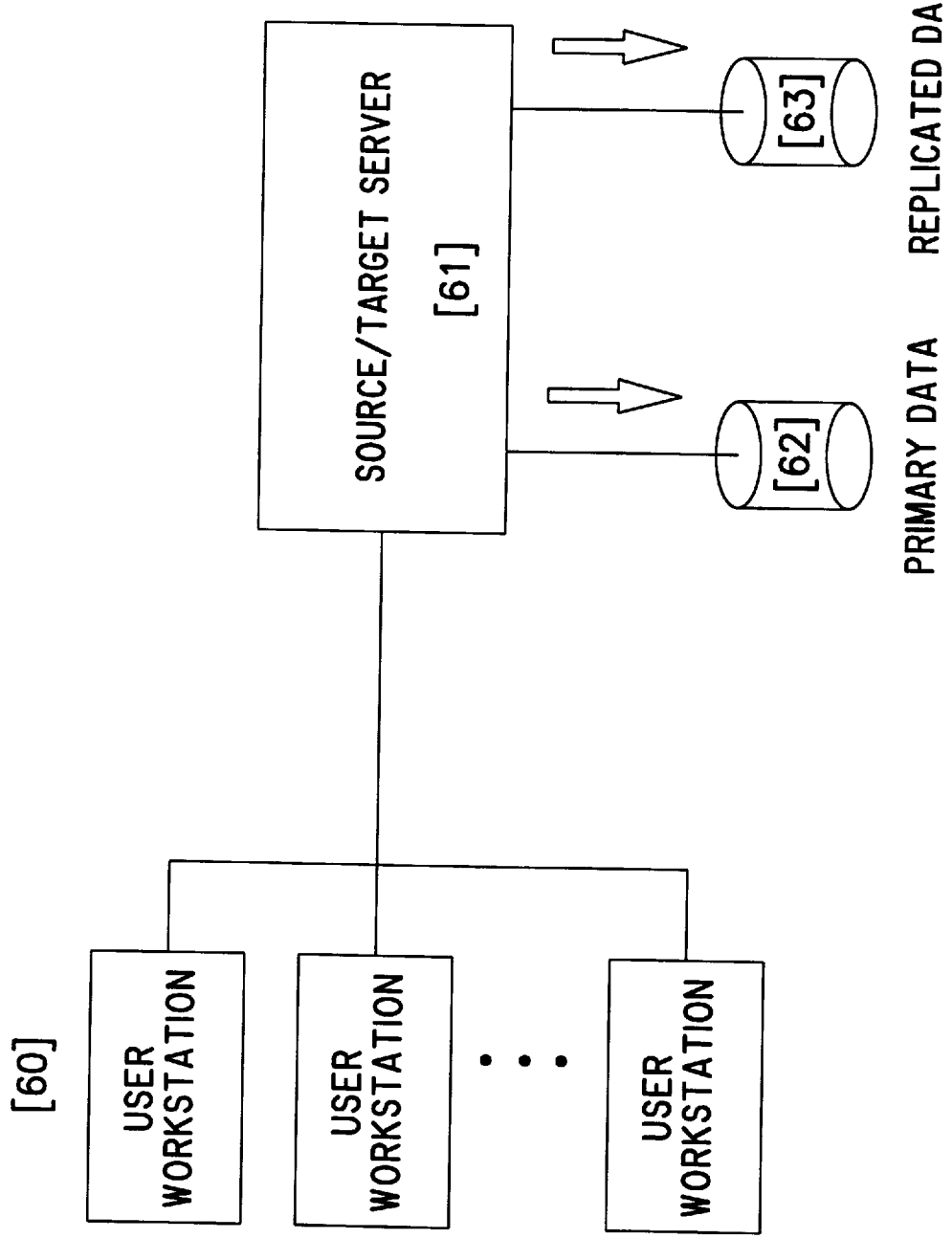
FIG. 6 is a block diagram of a computer network in Single-Server replication configuration.

The example configuration shown in FIG. 3 is referred to as One to One mode, (i.e., a single source server [31] is replicated to a single target server [33]). Other configurations include Many to One, One to Many, and Single Server. In Many to One mode, several source servers [42] are replicated to single target server [44], as shown in FIG. 4. In One to Many mode, single source server [52] is replicated to several target servers [54], as shown in FIG. 5. In Single Server mode, source server [61] data is replicated to local file system [63], as shown in FIG. 6. Once the data is mirrored, workstations [60] send file modification requests to source/target server. When the modification request is executed on local file system [63], the source/target server then executes the file modification request on local file system [62]. One skilled in the art will appreciate that local file systems [62] and [63] can be one or two non-volatile data storage device. In the case, of one storage device, the primary data and replicated data will be in different volumes of the same data storage device. Further, it is always an option to attach a backup storage device to the target server.

Figure 7:
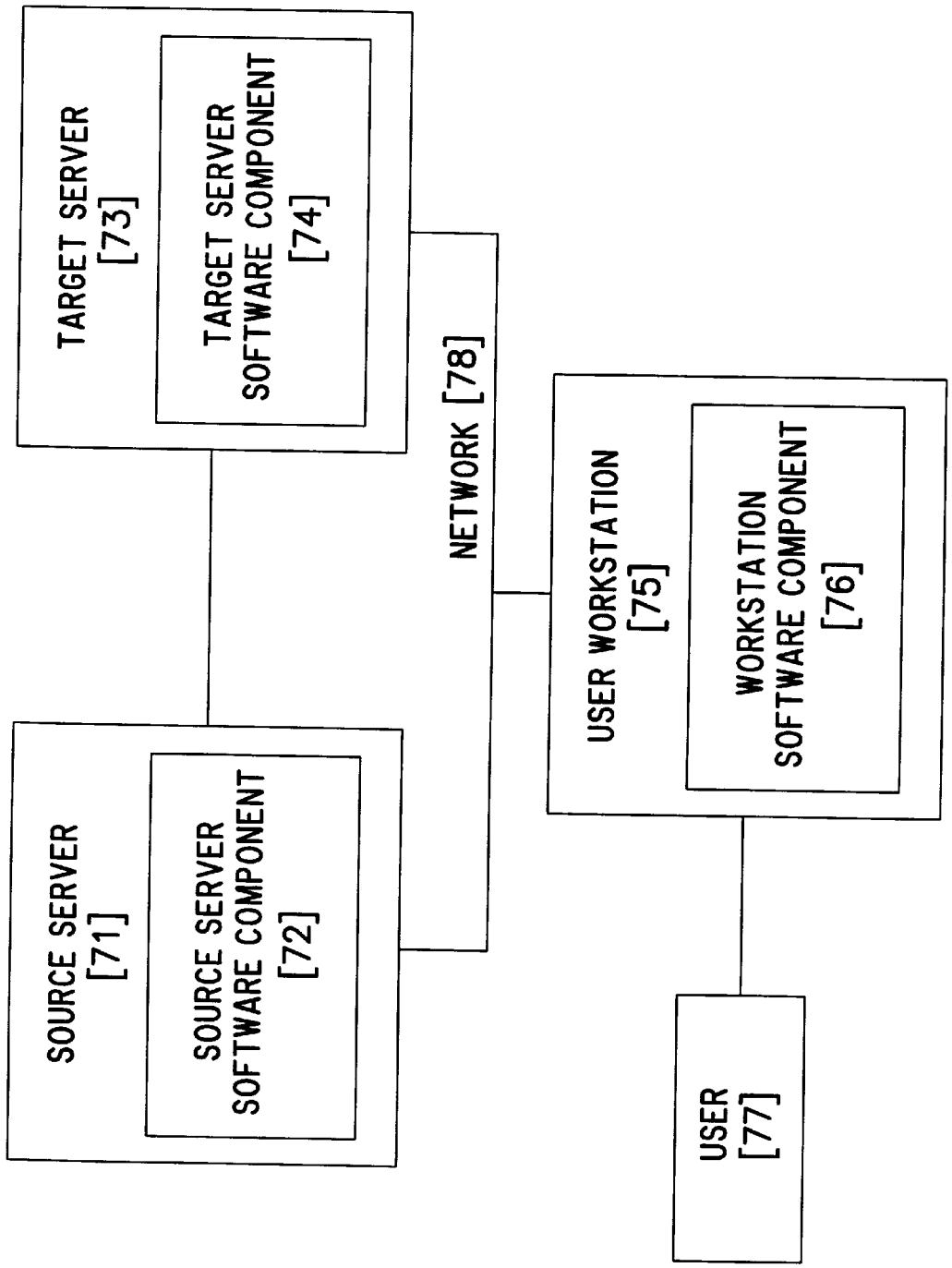
FIG. 7 illustrates the software components of the invention.

The components of this invention include three independent applications: a workstation component [76], source server component [72], and target server component [74]. FIG. 7 shows the relationship between these components and the hardware described in this example. These components are described in detail in the following sections:

Workstation Component [76]

The primary function of the workstation component [76] is to allow the users [77] to configure the replication process, and communicate this configuration to source server [71] and target servers [73]. This component can be executed on any workstation [75] on the network [78]. While the workstation component [76] is required to configure and initiate replication between two or more servers, it is not required to execute during normal operation.

Figure 8:
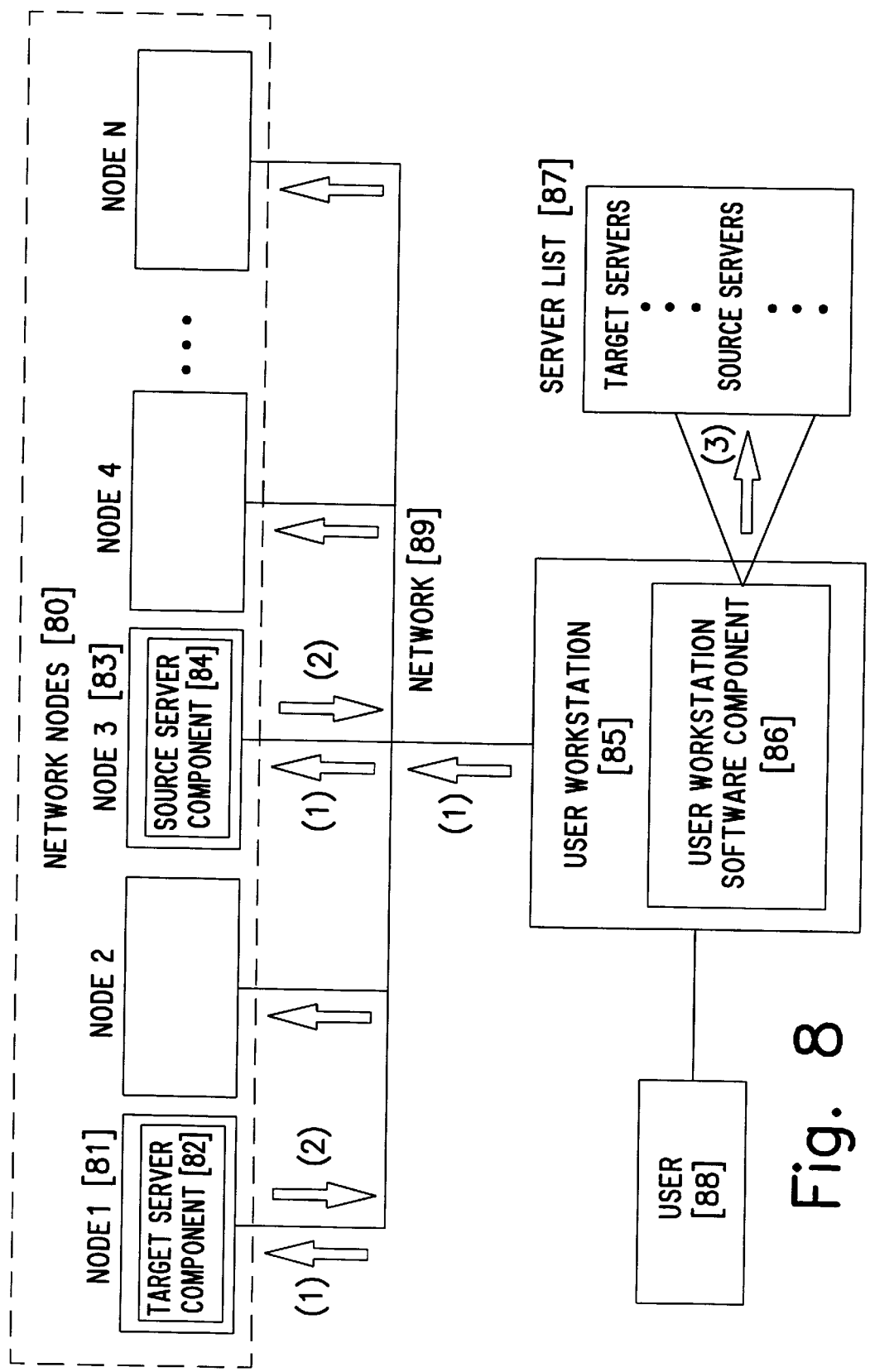
FIG. 8 illustrates the polling sequence for identifying source and target servers.

As depicted in FIG. 8, from workstation [85], user [88] may configure the following:

Target Sever(s)—User [88] selects one or more target servers [83] where replicated information will be stored. At startup, the workstation [85] broadcasts a message (1) to each network node [80] to determine if the node is configured as a target server [83]. If node [83] is configured as a target server [81], a response (2) is sent to the requesting workstation [85] denoting that the specified node [83] is available. A list of all available target servers [87] is maintained (3) on the workstation [85], and is displayed to the user [88] for target server [83] selection. When target server [83] is selected by user [88], it is referred to as current target server .

Source Server(s)—User [88] selects one or more source servers [84] to be replicated. At startup, the workstation [85] broadcasts a message (1) to each network node to determine if the node is configured as a source server [84], If node [83] is configured as a source server [81], a response (2) is sent to the requesting workstation [85] denoting that specified node [83] is available. A list of all available source servers [87] is maintained on the workstation [85], and is displayed to the user [88] for source server [84] selection. When a source server [84] is selected, user [88] must specify the location on the current target server [82] where the source server [84] data is to be replicated, inform of a directory or subdirectory path name. The source server [84] is then connected to current target server [82] via the network interface [89], and replication begins to the specified directory location on current target server [82].

Source Server Disconnect—User [88] selects specific source server [81] to disconnect from current target server [83]. A list of source servers [87] connected to the current target server [83] is available for user selection. If a source server [81] is selected to be disconnected, a network message (1) is sent to the current target server [83] to perform the disconnect. Once disconnected, no further replication is done between specified source server [81] and current target server [83].

Replication Mode—User [88] selects replication mode for each source server [81]. Replication mode refers to the method in which data is replicated to the current target server [83], and the level of error checking required before a transaction can be committed. Valid replication mode settings are real mode, local mode, and remote mode. Each mode is described in further detail under the source server component section.

Replication Set—User [112] selects the volumes, directories, and files [117] to be replicated from a specific source server [110], referred to as the replication set [113].

Figure 11:
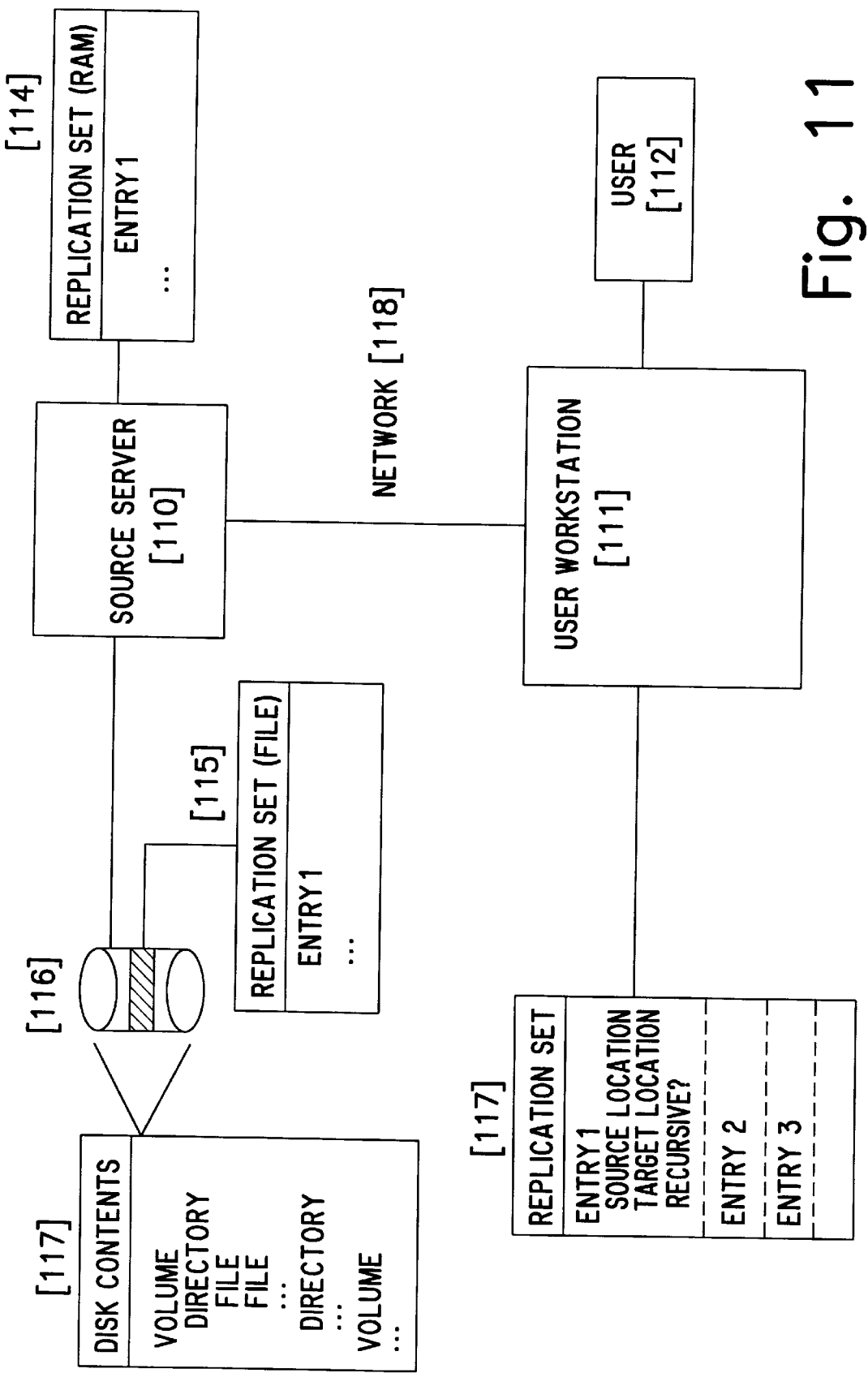
FIG. 11 illustrates replication set selection.

Replication set [113] selection is shown in FIG. 11. The user [112] may select the replication set [113] from the available volumes, directories, and files [116] on the source server file system [116]. When the user [112] is finished selecting the replication set [113] from a workstation [111], a copy of the replication set [113] is stored on the source server file system [116] in file format [115]. The workstation [111] then transmits a network message [118] to the source server [110] denoting that the replication set file [115] is ready to be loaded. The source server [110] loads the replication set from file [115] to local memory [114].

Figure 10:
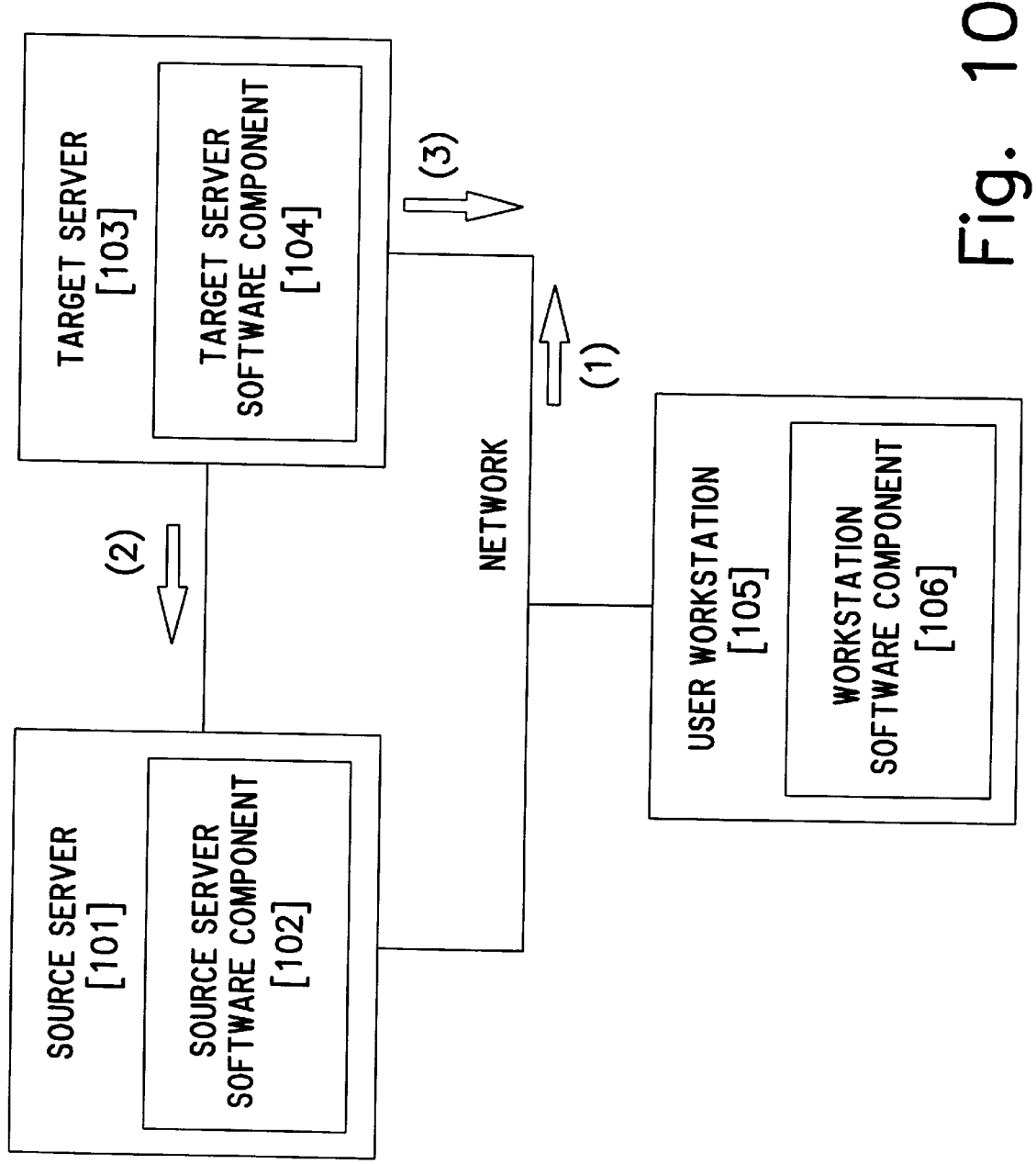
FIG. 10 illustrates the sequence of operations for a server restore request.

As depicted in FIGS. 10 and 11, whenever a source server [101] is connected to a target server [103] according to this invention, the replication set file [ 15] is copied from the source server [110] to the workstation [111], and is used as the default replication set [113].

Figure 9:
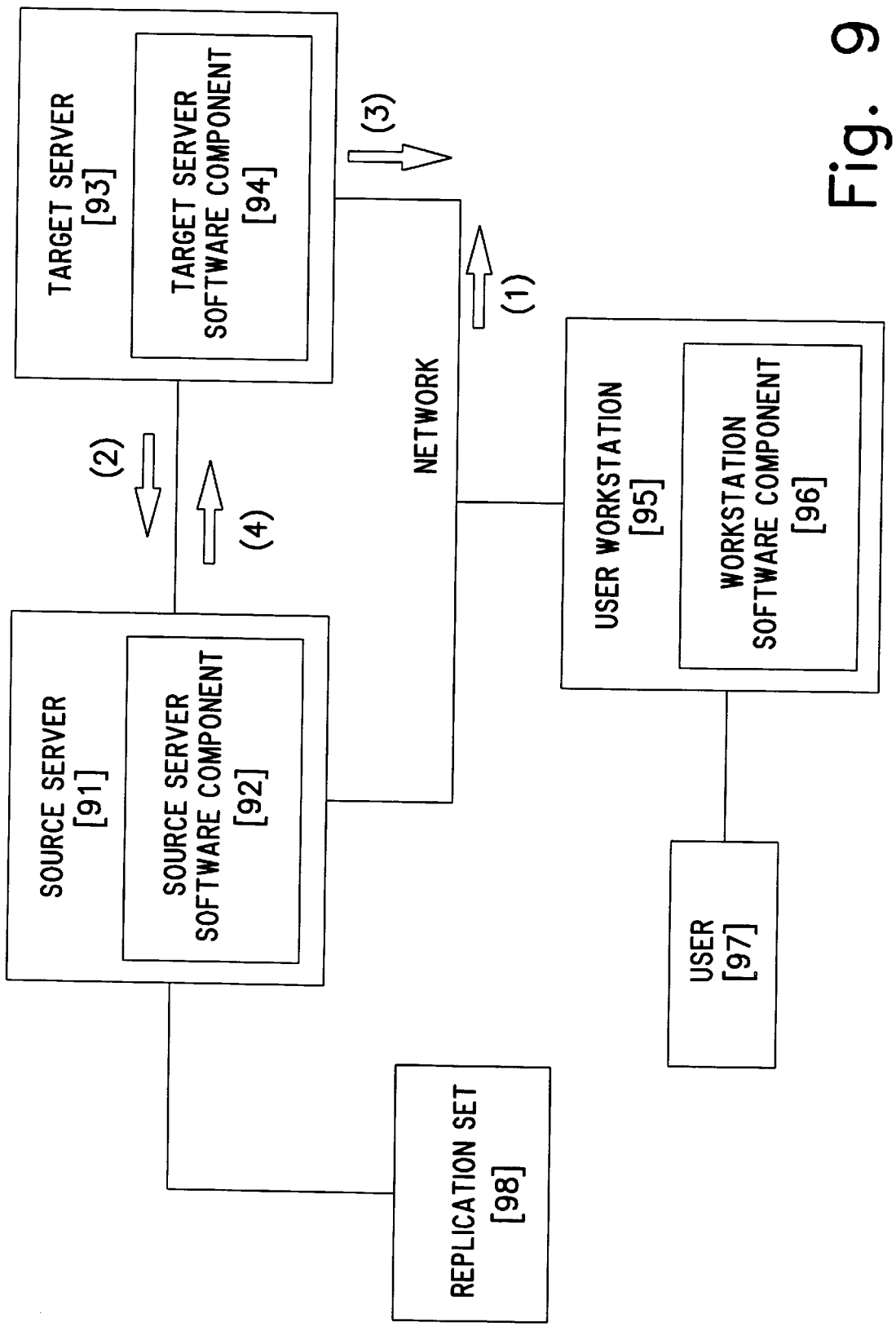
FIG. 9 illustrates the sequence of operations for a server mirroring request.

As further depicted in FIG. 9, a further function of the workstation component [96] is to initiate mirroring and monitor replication status. From workstation interface [97], the user may initiate the following actions:

Initiate Mirroring—When mirroring is requested for specific source server [91], all of the volumes, directories, and files specified in replication set [98] are copied from the source server [91] to target server [93]. Initially, a mirroring request (1) is transmitted from workstation [95] to the target server [93], and is then forwarded to source server [91]. Once the mirroring request is forwarded to source server [91], a response message (3) is sent to workstation [95] to denote that mirroring is under way. The source server [91] then sends the necessary file information (4), as well as user account information (such as user name, file ownership, and file access permissions) to specified target server [93].

Initiate Restore—When a restore is requested for specific source server [101], all replicated information (including files and user information) is copied (2) from the target server [103] to source server [101]. As depicted in FIG. 10, a restore request (1) is transmitted to the target server [103] from the workstation [105]. If the files to be copied already exist on the source server [101], they will be overwritten during the restore process.

Figure 12:
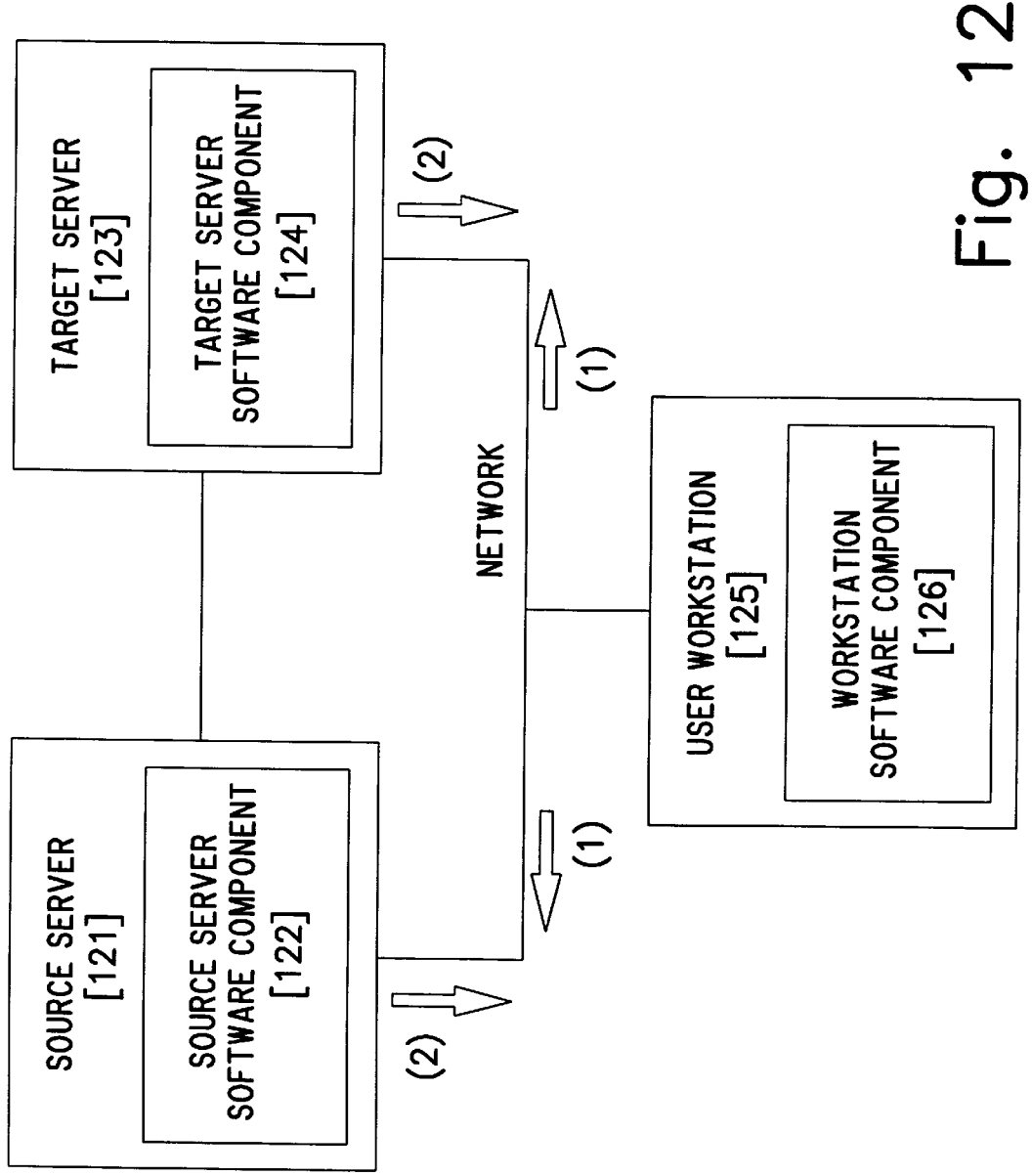
FIG. 12 illustrates the sequence of operations for a requesting source and target server status.

Display Replication Traffic—As depicted in FIG. 12, the status of replication traffic between all connected source servers [121] and current target server [123] is displayed whenever the workstation component [126] is executing. The workstation component [126] requests (1) status regarding each source server [121] from the target server [123] on a periodic basis, as shown in FIG. 12. If any packets have been transmitted between specific source server [121] and current target server [123] since the last status request, a graphical indication of that traffic is displayed(2).

Display Target Server Statistics—Statistics on target server [123] operations can be displayed at the operators request. Statistics include, but are not limited to, number of packets received, number of errors encountered, number of replication commands received per command type, number of bytes received, and number of bytes transmitted. These statistics are sent from the current target server [123] on a periodic basis, as described in the preceding paragraph.

Display Source Server Statistics—Statistics on source server [121] operations may be displayed at the operators request. Source server statistics are requested from the specified source server [121] via a network message (1) as they are needed, as shown in FIG. 12. Statistics include, but are not limited to, number of packets transmitted, number of errors encountered, number of replication commands transmitted per command type, number of packets in stacked-up mode, and number of bytes transmitted. These statistics are sent from current source server [121] on a periodic basis.

Source Server Component

Figure 13:
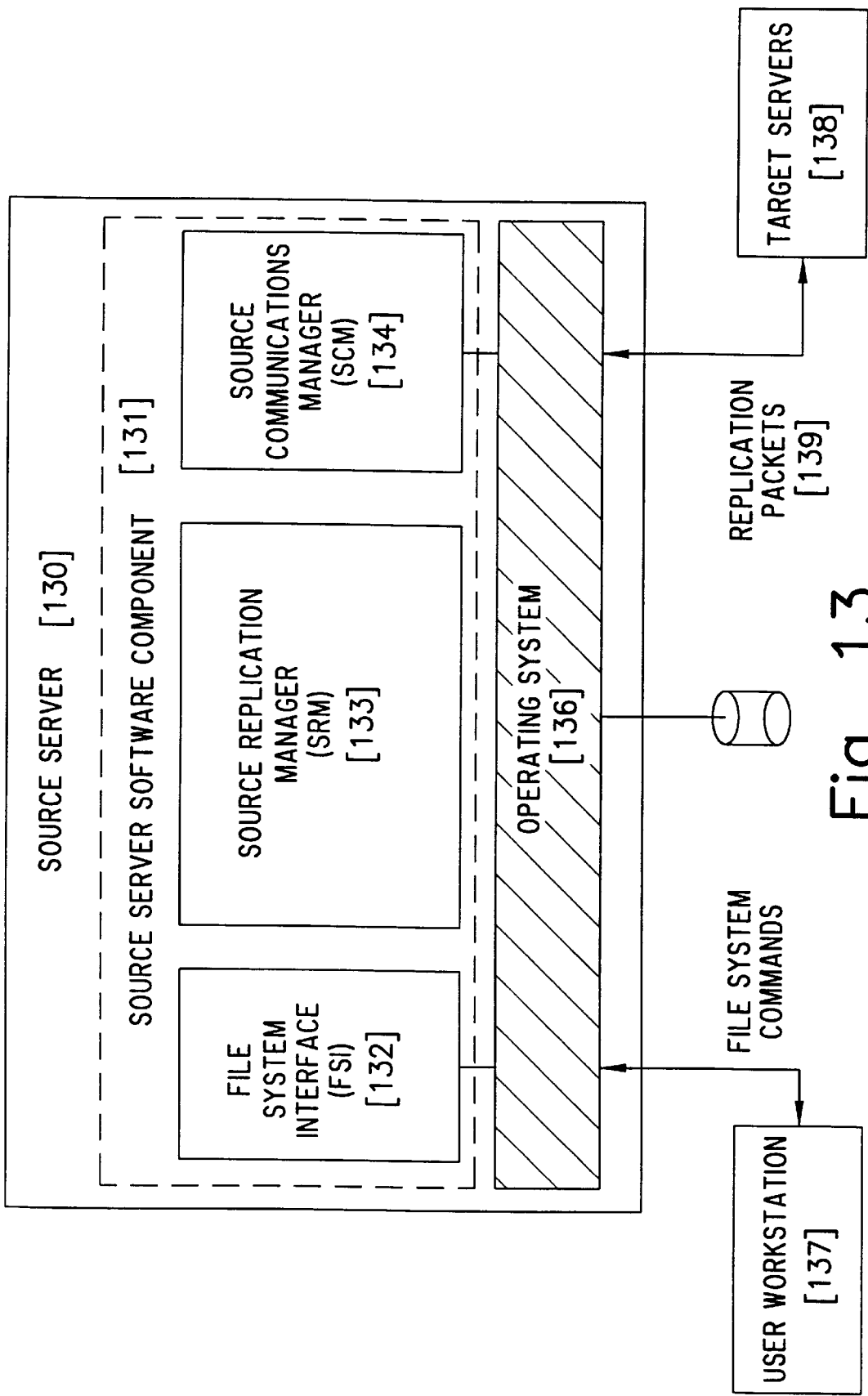
FIG. 13 is a block diagram of the source server software component.

The primary function of source server software component [131] is to intercept any file system commands [137] from the local operating system [136], and forward such commands [137] to the current target server [138] if necessary. A block diagram of the source server software components is shown in FIG. 13. The File System Interface (FSI) [132] monitors file system operations from the operating system [136] to determine when changes are being made. The Source Replication Manager (SRM) [133] determines whether file system changes should be replicated, builds the network packets [139] required to effect such replication, and controls the flow of these network packets [139] using queuing techniques. The Source Communications Manager ("SCM") [134] sends and receives replication packets [139] to/from the target server [138].

The source server software component [131] is loaded on each source server [130] at startup, and remains resident in memory until it is explicitly unloaded by the user, or the source computer [130] is powered off. A source server [130] must be connected to at least one target server [138] for replication to be performed. If a source server [130] is connected to multiple target servers [138], replication commands are transmitted to each target server [138] in the order they were connected.

Figure 14:
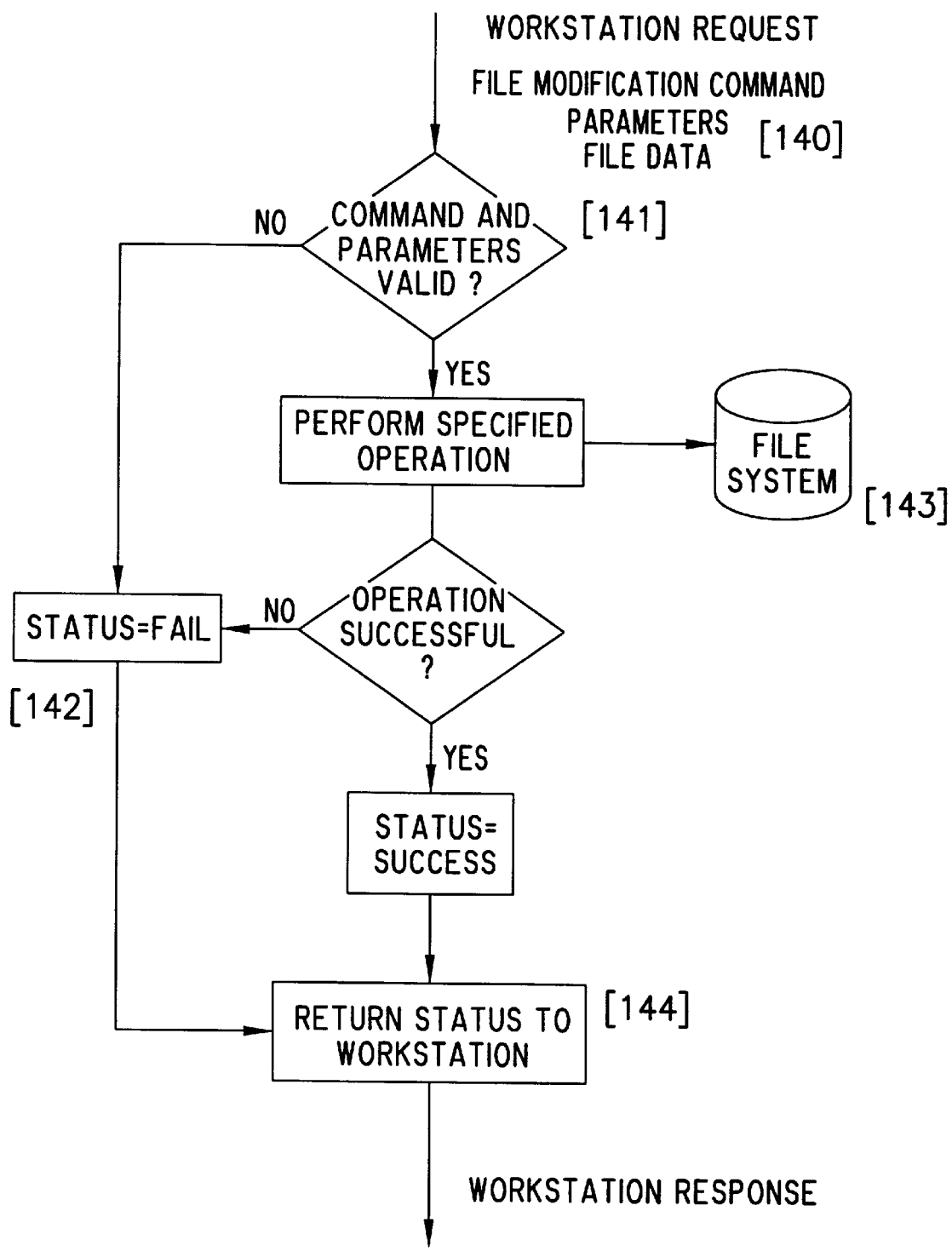
FIG. 14 is a flowchart representing the typical file modification process, without replication.

The function of File System Interface ("FSI") [132] is to monitor operating system [136] commands to any file systems associated with the source server [130]. The flowchart depicted in FIG. 14 shows the typical path of such a command, without replication. A file system command [140] is received from a workstation via network messages, and error checking is performed to make sure the command and its associated parameters are valid [141]. If the command or parameters are not valid, a failed status message is returned to the requesting workstation [142]. If the command and parameters are valid, the file system operation is performed [143], and an appropriate status message is returned to the requesting workstation [144].

Figure 15:
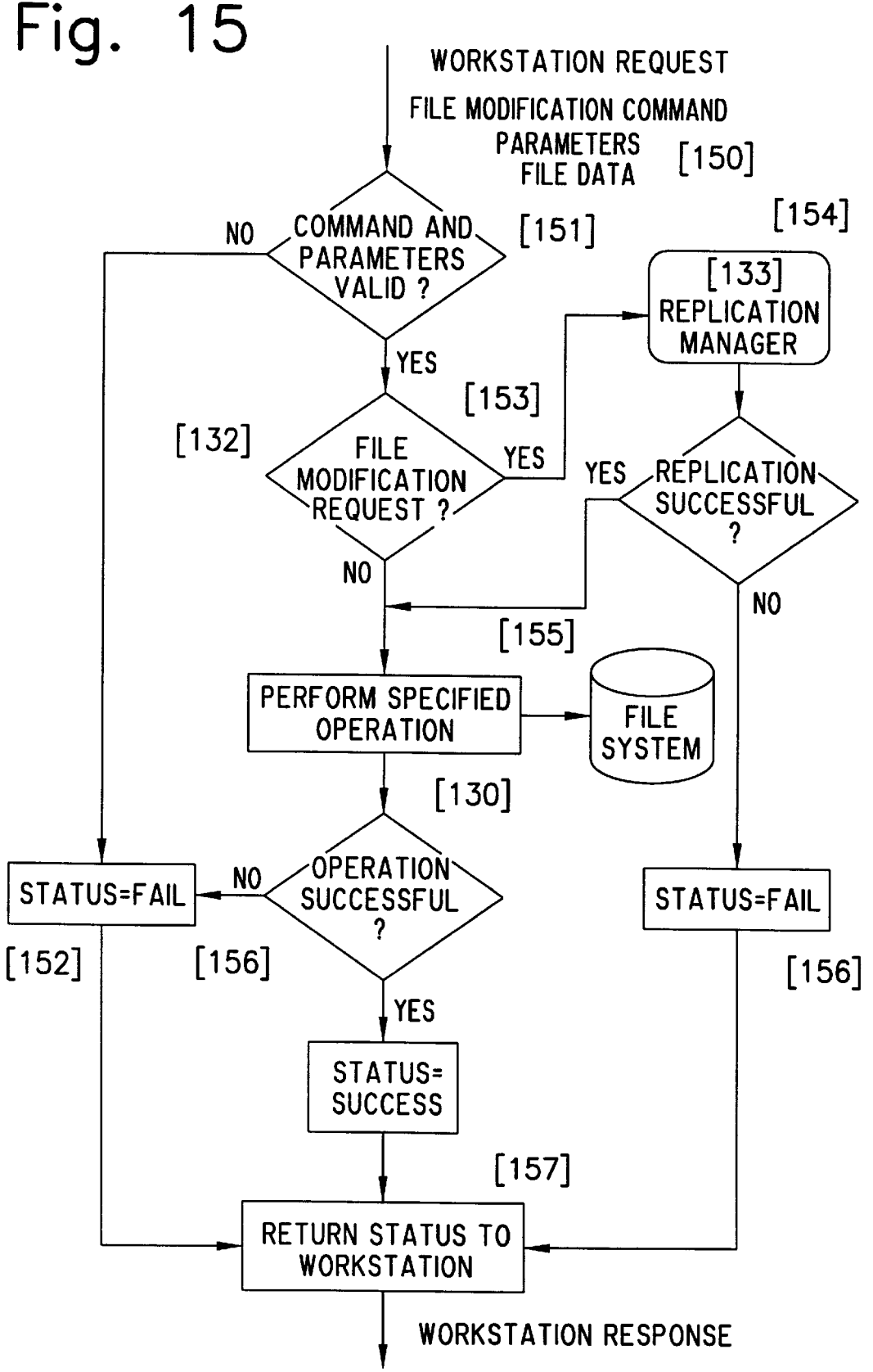
FIG. 15 is a flowchart representing the operation of the File System Interface (FSI).

The flowchart in FIG. 15 shows the modified path of a file system command [150] according to this invention, with the addition of FSI [132]. A file system command [150] is received from a workstation via network messages, and error checking is performed to make sure the command and its associated parameters are valid [151]. If the command or parameters are not valid, a failed status message is returned to requesting workstation [152]. If the command and parameters are valid, FSI [132], checks the command type to see if it is a file modification request [153]. All file modification requests are forwarded to Source Replication Manager [133] for replication [154]. If the command is successfully replicated by Source Replication Manager [133], original file system operation is performed [155] on source server [130]. If replication is not successful, a failed status message [156] is returned to requesting workstation [157].

Only operations that cause modifications to source server file system [155] are monitored via this process. Such operations include, but are not limited to: writing to a file, creating a file, deleting a file, renaming a file, creating a directory, deleting a directory, renaming a directory, changing file or directory attributes, and changing file ownership or permissions. Operations that do not modify source server file system [155], such as reading a file, are not monitored by this process.

Figure 16:
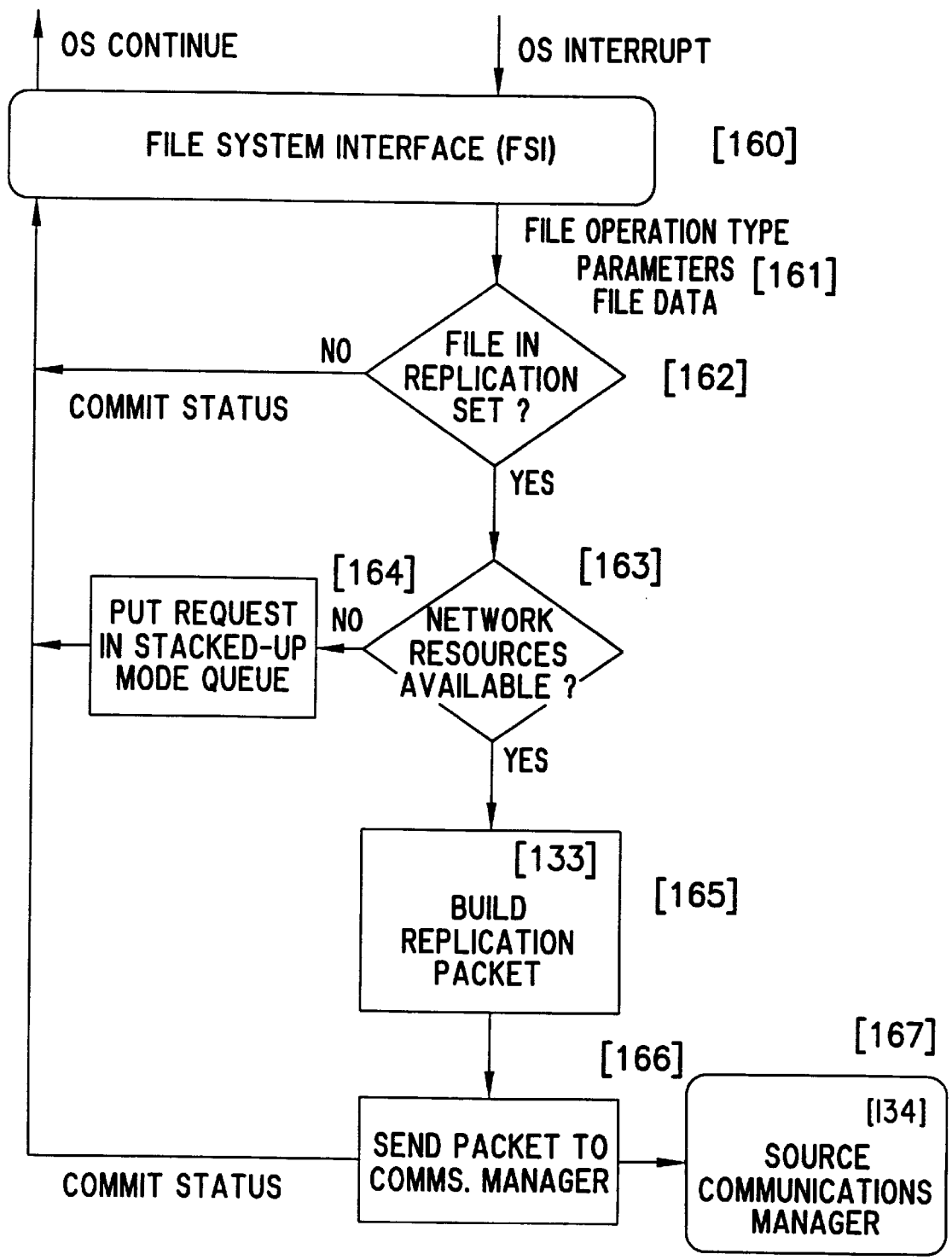
FIG. 16 is a flowchart representing the operation of the Source Replication Manager (SRM).

The primary function of Source Replication Manager [133] is to replicate specific file system commands as received from the FSI [132]. FIG. 16 shows a high-level flowchart of this process. When a file system command

[161] is received from the FSI [160], Source Replication Manager [132] first determines if file referenced by the command is included in the current replication set [162]. If it is not, control is immediately returned to the FSI [160] with a status message indicating the original file system operation may be executed.

If the file associated with the current file system operation is included in the replication set, the operation will be replicated. As depicted in FIGS. 13 and 16, Source Replication Manager [133] first checks to see if network resources are available to send a replication packet [163] to target server [138]. The Source Replication Manager [133] is limited to a specific portion of all available network resources on source server [130], to avoid locking out other network operations. If resources are not available, the file system operation is placed in stacked-up mode [164], which is described in later sections.

If network resources are available, Source Replication Manager [133] forms a replication packet for the modifications required, The replication packet includes the type of file system operation requested (e.g. write file, create directory, change file attribute), all of the associated parameters required to replicate the operation, and the file data associated with this request. The format of each replication packet is such that parameters required to replicate the transaction on any operating system are supported. Only those parameters required for target operating system are populated on any given message. This packet is forwarded to Source Communications Manager. The Source Communications Manager returns a status message to Source Replication Manager [133] when replication packet has been received and executed on specified target servers [167].

The source server [130] may operate under one of the following replication modes; real, local, or remote mode. The mode selected determines when a replication transaction is considered complete (or committed), allowing control to be returned to the FSI [132]. In real mode (shown in FIG. 16), the transaction is considered complete when one of the following conditions is met: (a) when replication packet [166] is successfully forwarded to Source Communications Manager [134]; or (b) when the command is successfully placed in stacked-up mode queue [164] (stacked-up mode only). The Source Replication Manager [133] does not wait for confirmation from Source Communications Manager [167] that the packet has actually been received or executed by target server [138] before completing the transaction. Therefore, as depicted in FIG. 15, original file system operation [155] will always be executed on source server [130], even if replication failed. If the status message returned (see FIG. 17) from the target server [175] indicates that the transaction [176] was replicated successfully, the transaction [1 76] is removed from the transaction log file [174]. If the status message indicates that the transaction [176] was not completed successfully on the target server [175], the source server [172] will attempt to resend the transaction [176] to the target server [175]. If the transaction [176] is still not completed successfully after a specific number of retires, this transaction [176] will be flagged as an error in the transaction log [174]. A flowchart of this process is shown in FIG. 18.

Figure 17:
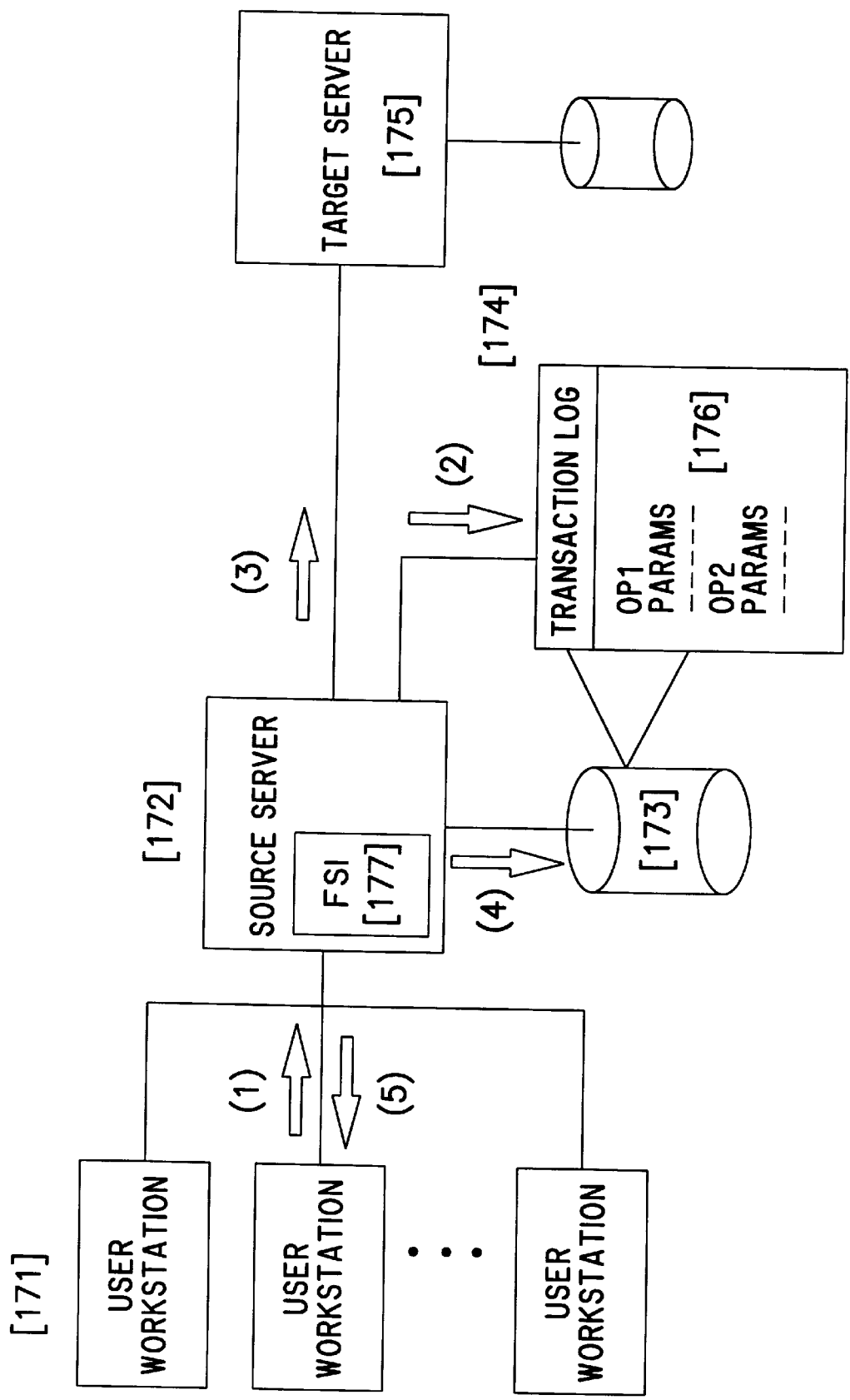
FIG. 17 illustrates local-mode operation, with logging to a local transaction file.
Figure 18:
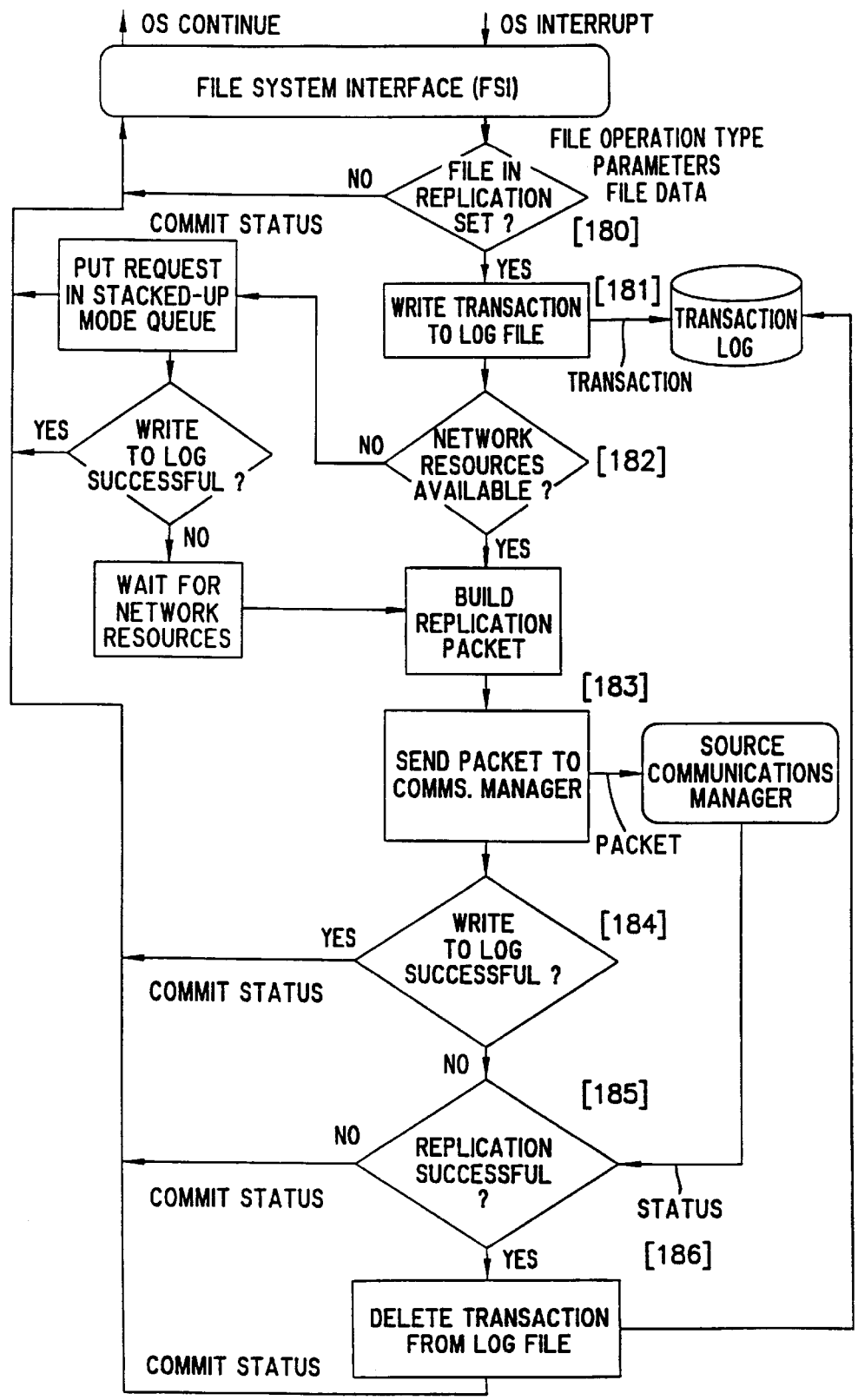
FIG. 18 is a flowchart representing local-mode operation.

As further depicted in FIG. 17, transaction information [176] to be stored in transaction log [174] includes the command type and parameters, as passed from the FSI [177]. The file data associated with each transaction is not stored to hard disk [173] in this mode, in order to minimize disk space requirements on source server [172]. When the transaction log [176] is later transmitted to target server [175] for execution, the data associated with each transaction [174] can be extracted from local source file [173]. In this case, source server [172] does not complete transaction [176] until it is successfully written to specified log file [174]. If the transaction [176] can not be written, an error message (5) is returned to calling workstation [171], and the original file system operation is aborted. While the operator delay may be increased because of the time required to write each transaction [176] to transaction log file [174], user [171] is guaranteed that transactions [176] are recorded. A Flow Chart of the local mode is depicted in FIG. 18.

Figure 19:
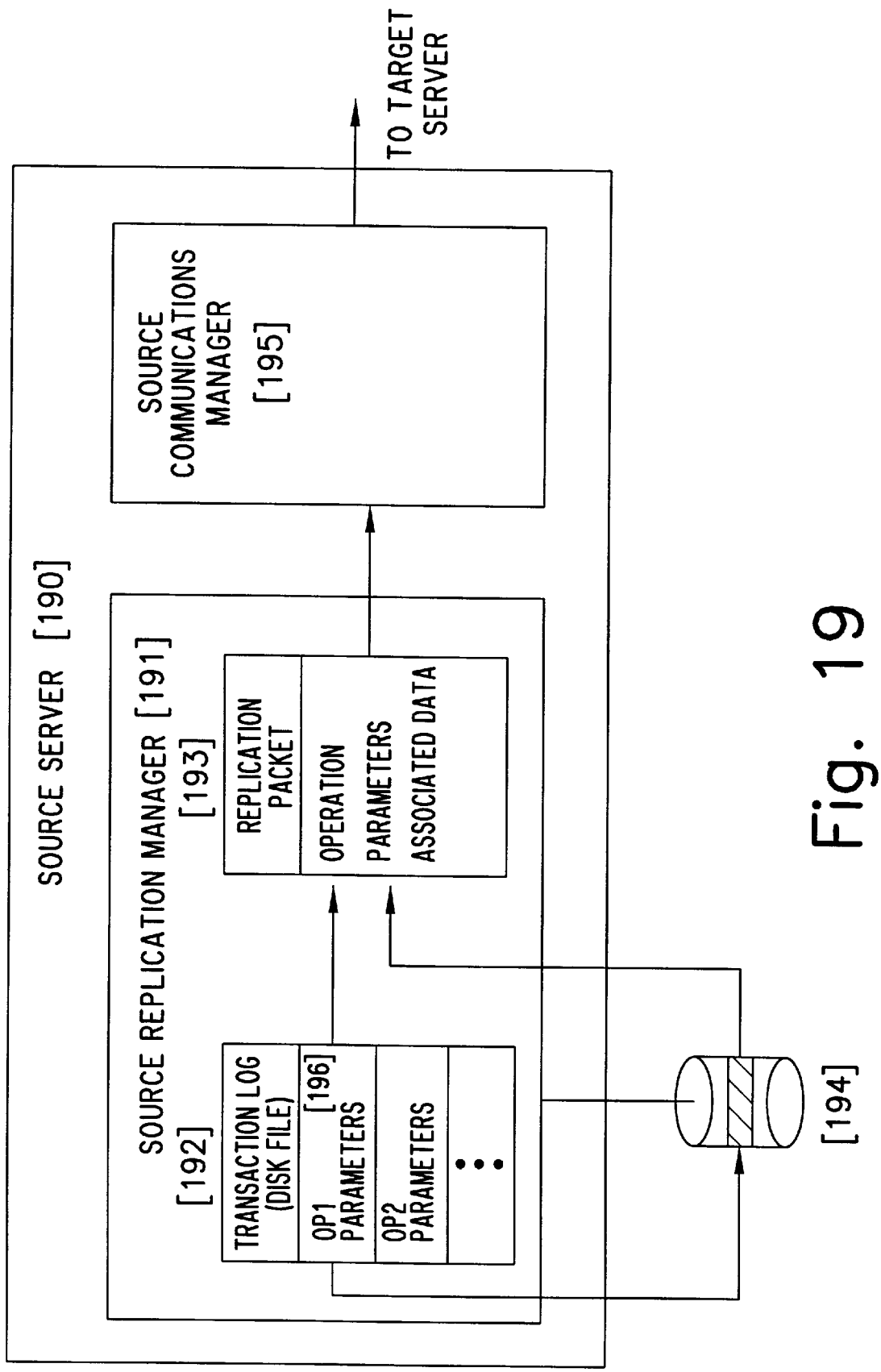
FIG. 19 illustrates the process of committing local-mode transactions.

FIG. 19 shows the manner in which local-mode transactions [196] in the log file [192] are serviced in the event of a retry. A transaction record [196] is extracted from log file [192] by the Source Replication Manager [191]. Using the parameters in the transaction record [196], associated file data [194] is extracted from the source server file system [194]. A replication packet [193] is formed from the operation type and parameters [196] from the transaction log [192], and the file data from the file system [194]. This replication packet [193] is then forwarded to the Source Communications Manager [195] for transmission.

Figure 20:
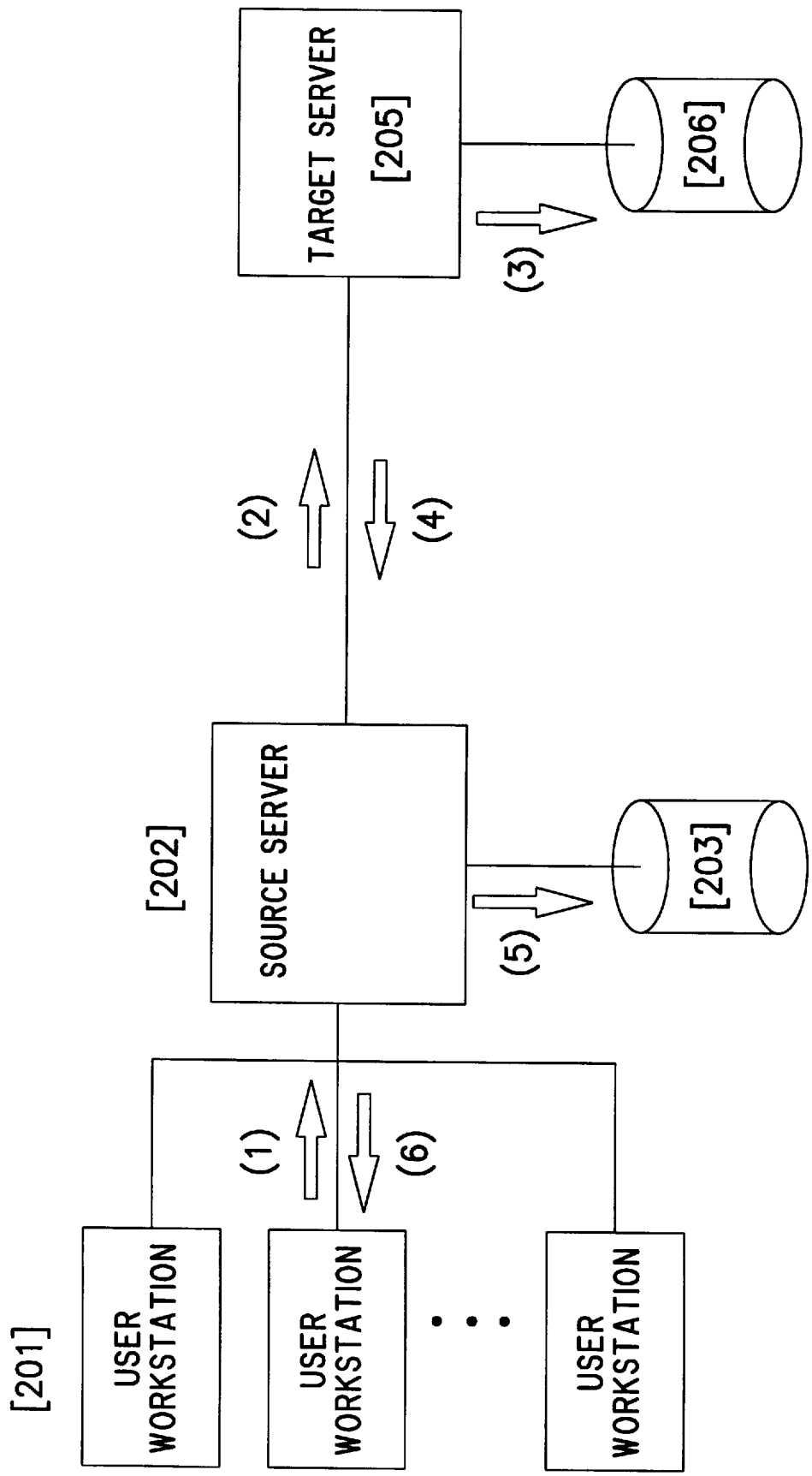
FIG. 20 illustrates remote (two-phase) operation.
Figure 21:
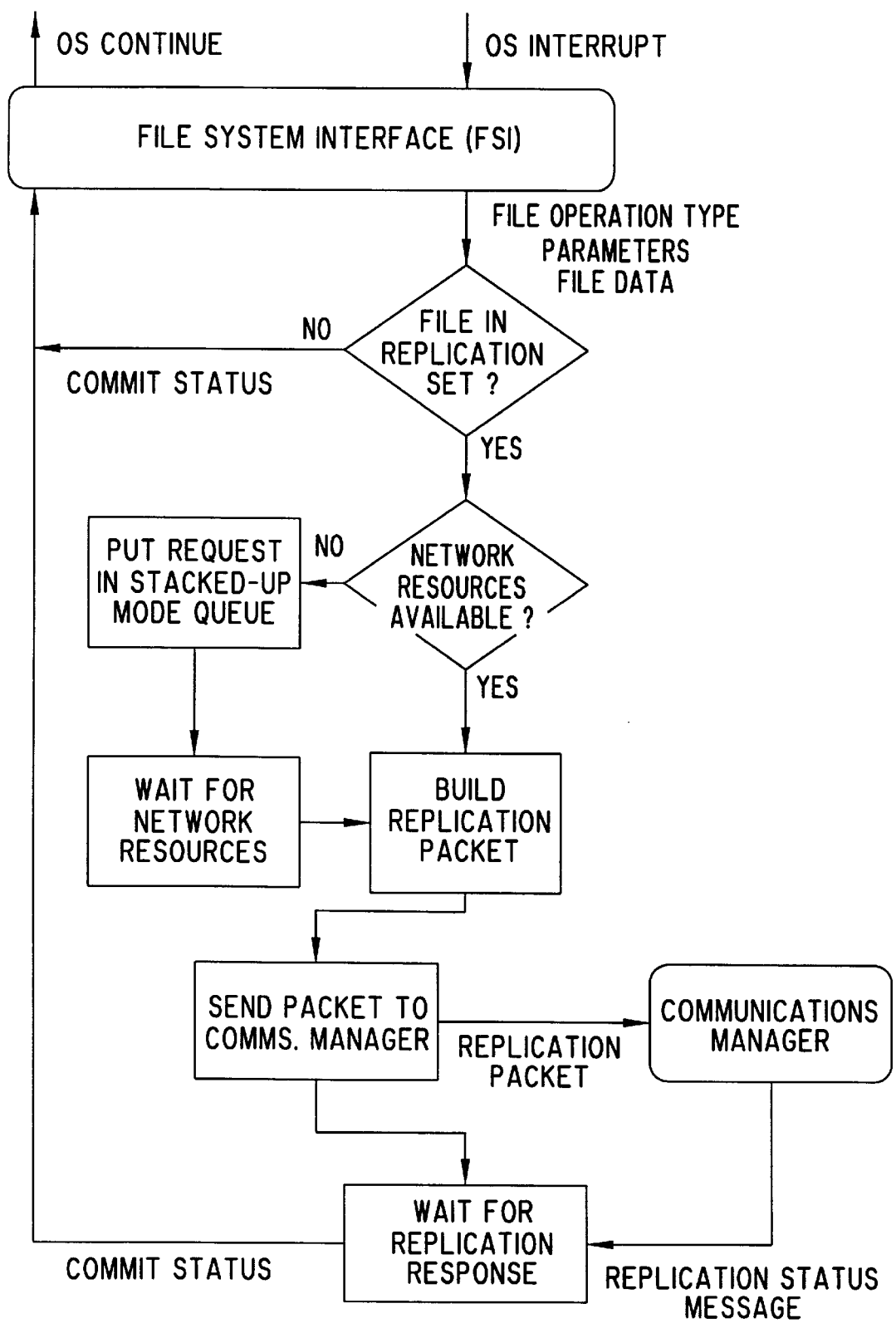
FIG. 21 is a flowchart representing remote (two-phase) operation.

Operation of remote mode is shown in FIG. 20. When the source server [202] receives a file modification request (1) from a workstation [201], it forwards the request (2) to the target server [205]. The target server [205] replicates the transaction (3) to the target server file system [206], then returns a status message (4) to the source server [202] denoting whether the transaction (3) was successfully replicated. If the status message (4) returned by the target server [205] denotes that the transaction (2) was successfully replicated, the original file modification request (1) is committed (5) on the source server file system [203]. If the status message (4) returned by the target server [205] denotes that the transaction (2) was not replicated, the original file modification request (1) is aborted. In either case, a status message (6) is returned to the requesting workstation [201] by the operating system, denoting whether the original file modification request (1) was performed on the source server [202]. A flowchart of this process is shown in FIG. 21.

Figure 22:
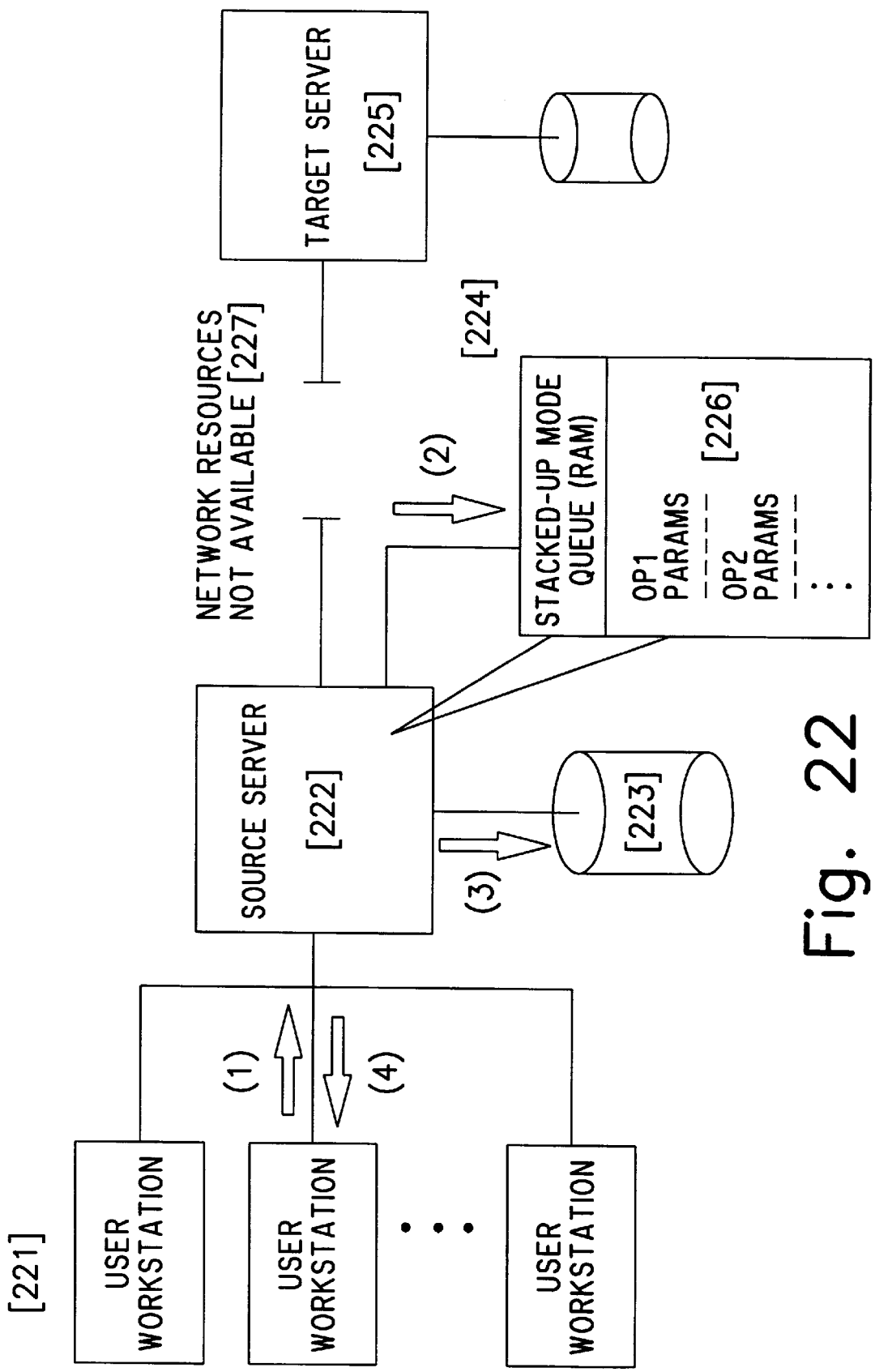
FIG. 22 is a flowchart representing stacked-up mode, with logging to an internal queue.

As noted previously and shown in FIG. 22, replication transactions [226] are placed in an internal queue [224] on source server [222] if network resources are not available to transmit the a replication packet to target server [205]. This condition is known as stacked-up mode. This condition may be caused by the loss of network connection [227] between source and server [222] and target servers, [225] or heavy network traffic. For each such transaction [226], source server [222] stores the command type and all associated parameters [226] in internal queue [224] in the order which it was received. The file data associated with this operation is not stored in this queue [224], as it can be extracted when the queue [224] is serviced.

Whenever a new transaction [226] is introduced to the stacked-up mode queue [224], Source Replication Manager [133] (See FIG. 13) attempts to merge transaction [226] with any other queue entry [226] that is associated with the same file. If two queue entries reference similar areas in the same file, they are candidates to be merged in to a single entry. The new entry will reflect the combination of both operations. If two entries reference significantly different areas in the same file, they will not be merged. If the number of bytes separating the two entries is less than the maximum packet size (a system configuration item), these packets will be merged.

Figure 23A:
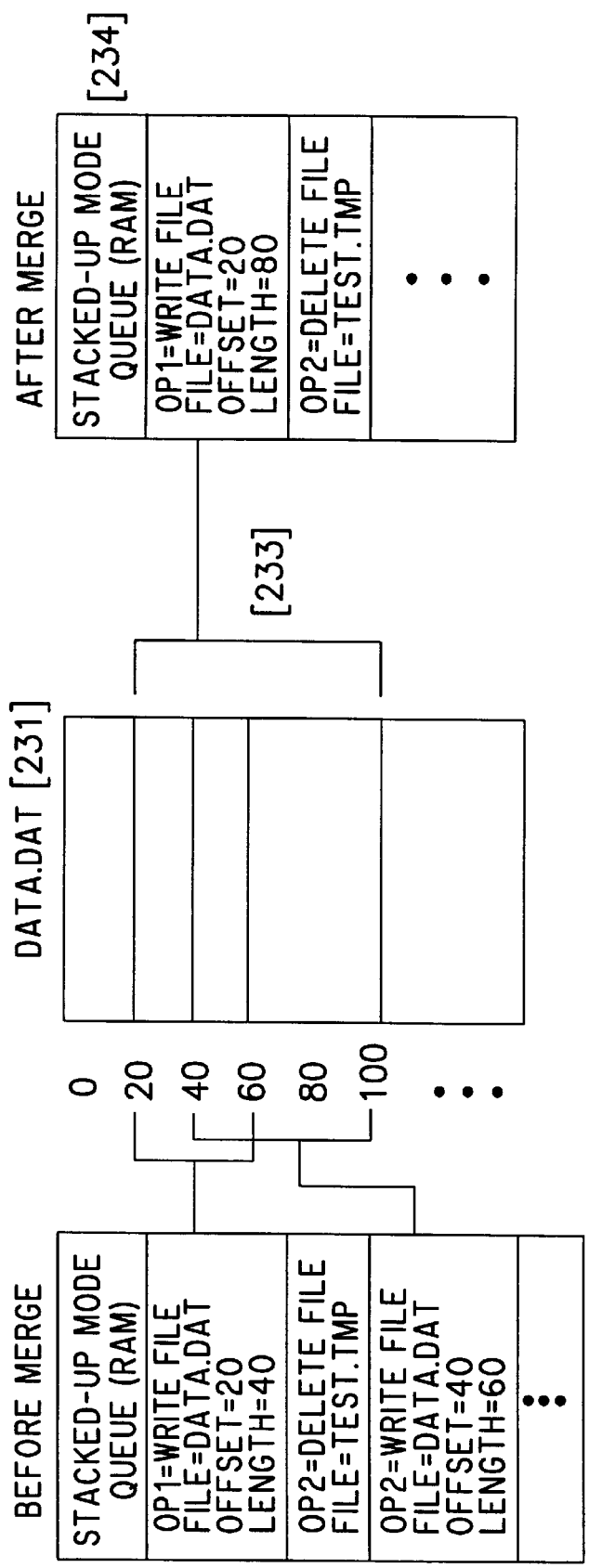
FIG. 23 (a) and (b) illustrate an example of stacked-up mode queues.
Figure 23B:
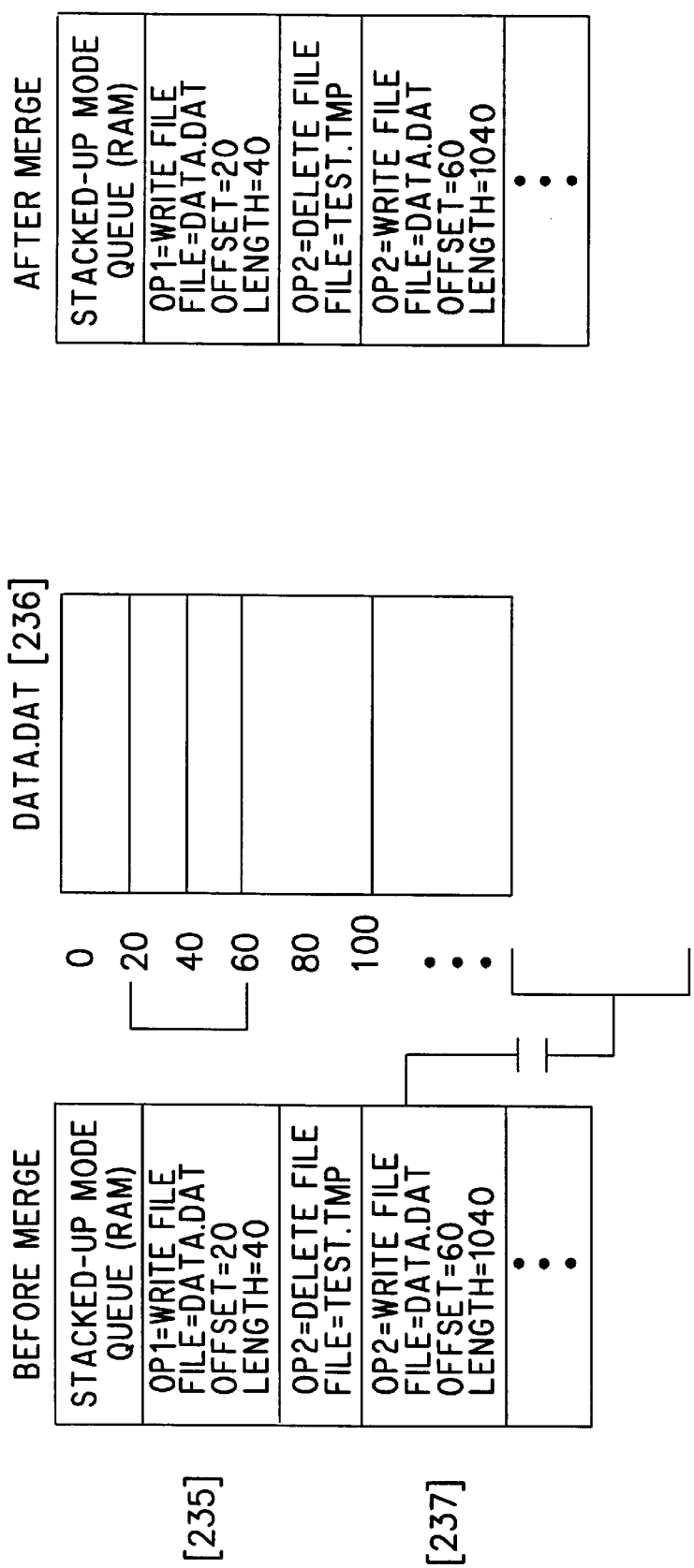

As an example, consider the two file operations shown in FIG. 23 (a). Operation 1 [230] writes 40 bytes to the file DATA.DAT [231], starting at byte offset 20. Operation 2 [232] writes 60 bytes to the same file [231], starting at bytes offset 40. Since these two entries [230,232] reflect operations in overlapping areas of the file [233], they can be combined in to a single entry denoted as Operation 1 on the merged queue [234]. This new operation [234] writes 80 bytes to the file DATA.DAT [231], starting at byte offset 20. Next, consider the two file operations shown in FIG. 23 (b), assuming a maximum packet size of 512 bytes. Operation 1 [235] writes 40 bytes to the file DATA.DAT [236], starting at byte offset 20. Operation 2 [237] writes 60 bytes to the same file [236], starting at bytes offset 1,040. Since these two entries [235,227] reflect operations in distinct areas of the file [236], and the difference between the packet offsets is greater than the maximum packet size, they will not be merged.

Figure 24:
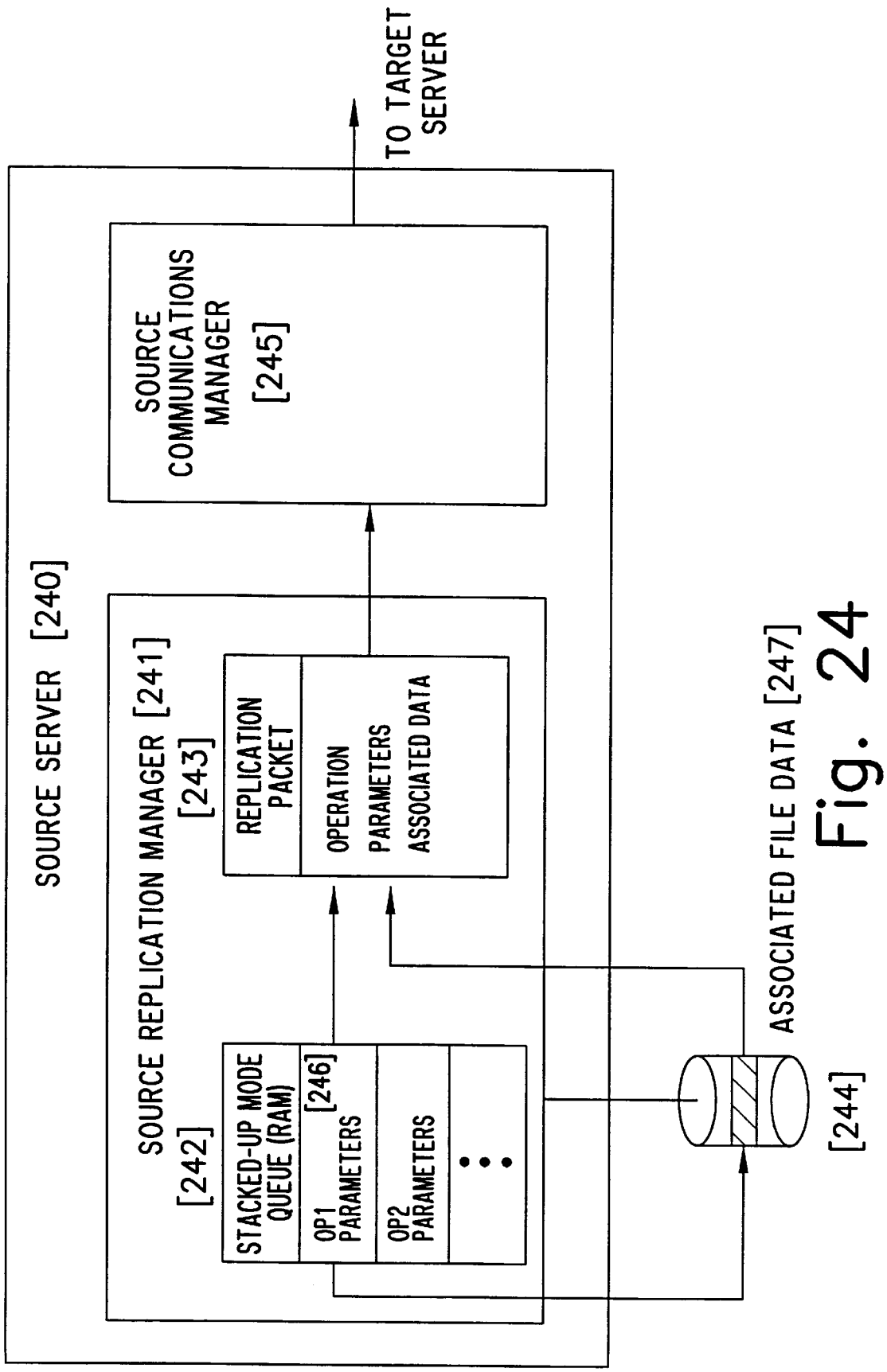
FIG. 24 illustrates the process of servicing entries from the stacked-up mode internal queue.

FIG. 24 shows the manner in which stacked-up mode queue entries [246] are serviced when network resources are available to transmit replication packets [243]. A transaction record [246] is extracted from the stacked-up mode queue [242] by the Source Replication Manager [241]. Using the parameters in the transaction record [242], the associated file data [247] is extracted from the source server file system [244]. A replication packet [243] is formed from the operation type and parameters [246] from the stacked-up mode queue [242], and the file data [247] from the file system [244]. This replication packet [243] is then forwarded to the Source Communications Manager [245] for transmission.

Figure 25:
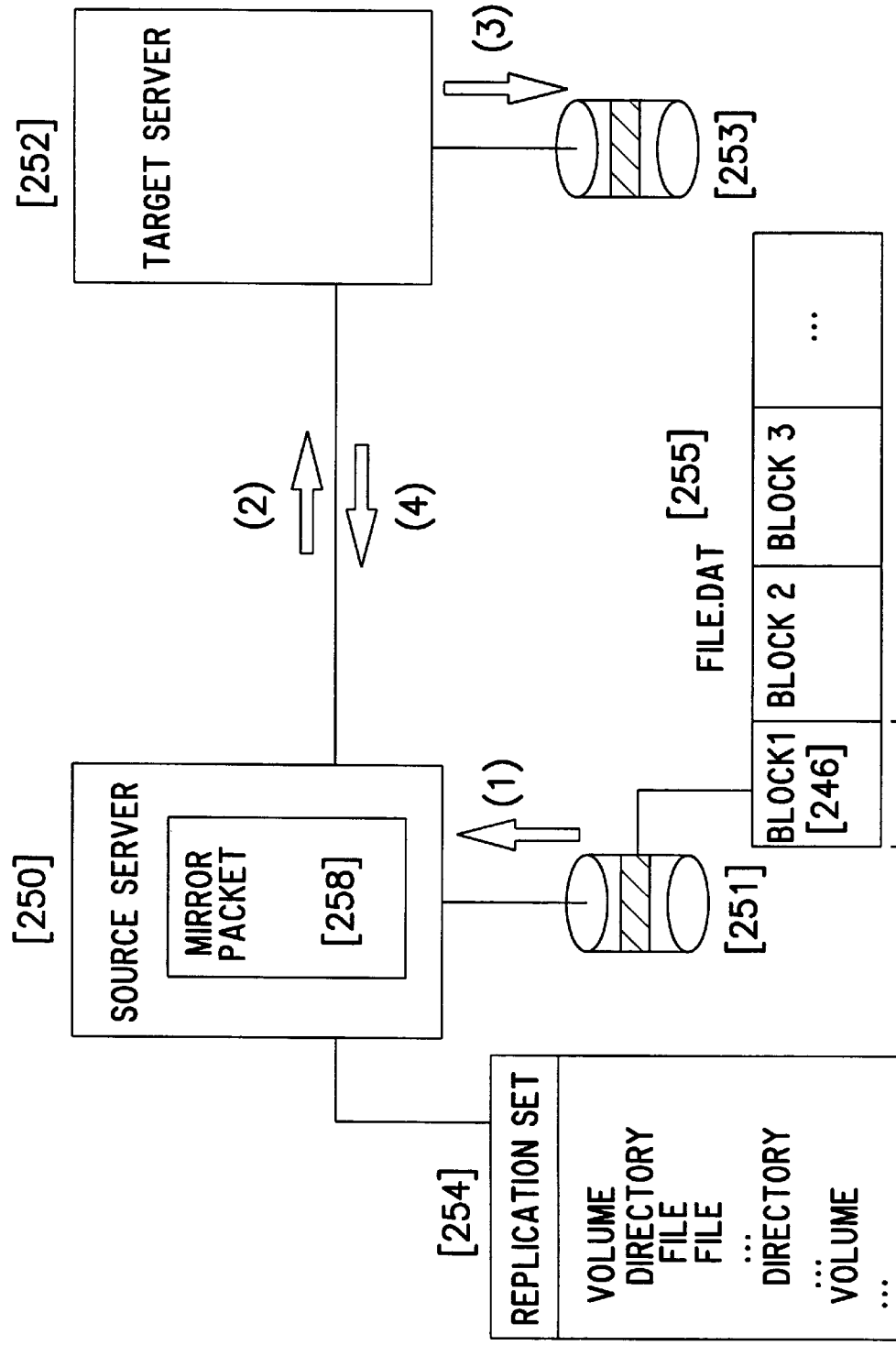
FIG. 25 illustrates the process of mirroring data from source to target computers.

Another function of Source Replication Manager [241] is to perform mirroring of source server data [251] to target server [252], as shown in FIG. 25. When mirroring is requested, Source Replication Manager [241] copies every volume, directory, and file listed in the replication set table [254] from source server [250] to target server [252]. The Source Replication Manager [251] extracts the data associated with each file [251], and builds a mirror packet [258] to be sent to target server [252]. If a file [255] is larger than the maximum packet size [257] on source server [250], it will be broken into smaller blocks [256] for network transmission. The queuing techniques described above for replication are used to control the flow of mirror packets (2) between source [250] and target [252] servers. The source server [250] may only send a limited number of mirror packets [258] at a time, in order to prevent locking out replication and other applications from network resources.

Figure 26:
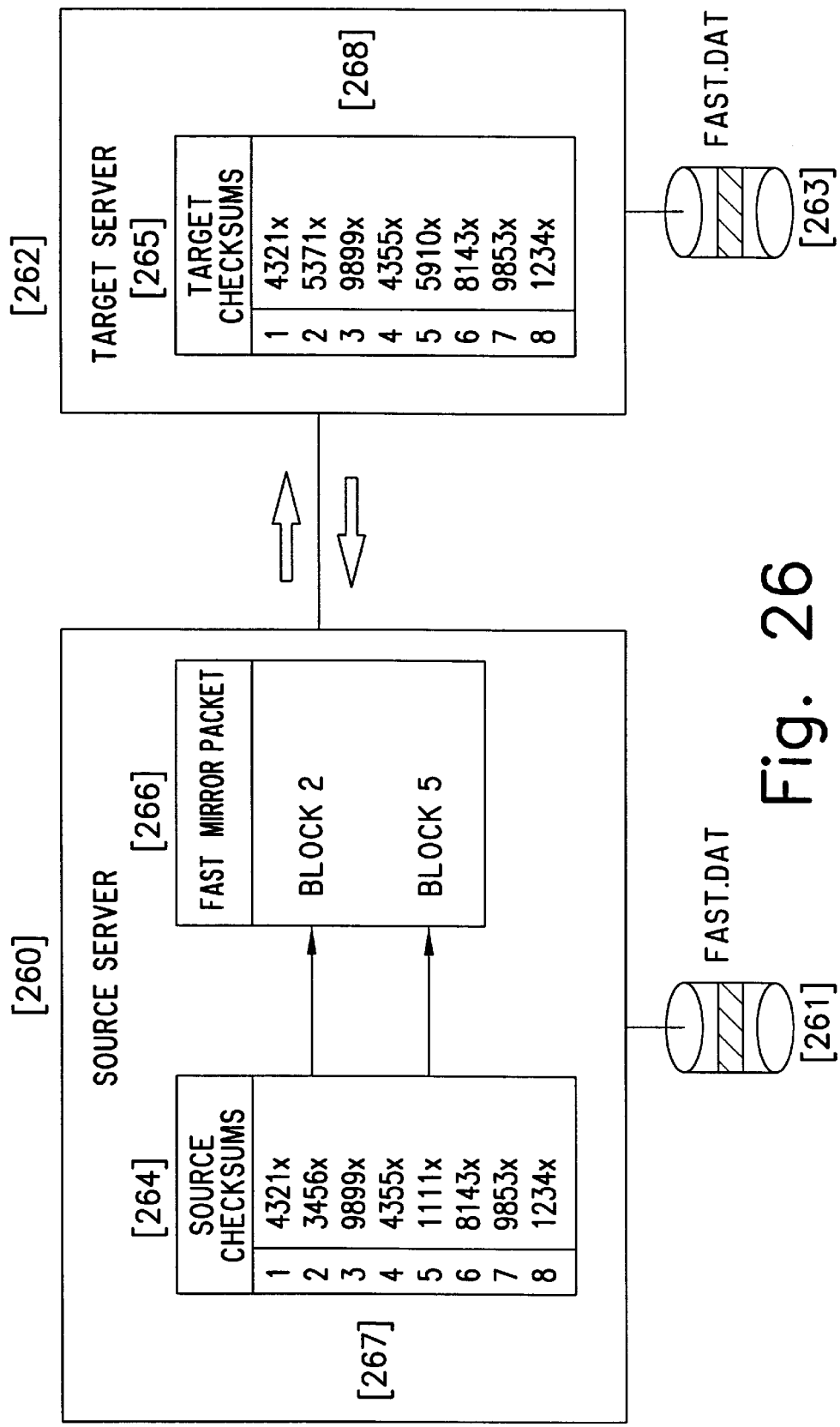
FIG. 26 illustrates the fast-mirroring process.
Figure 27:
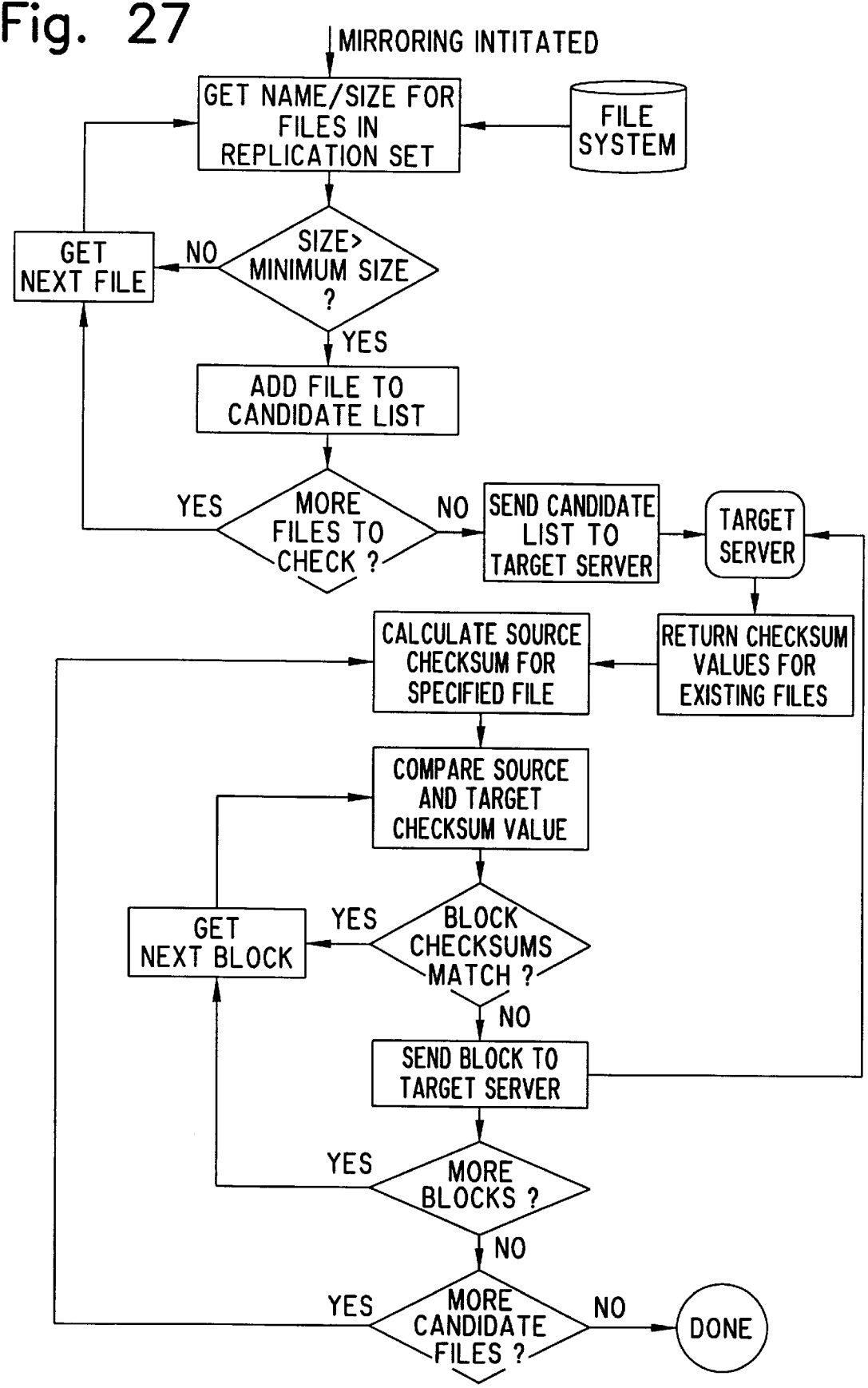
FIG. 27 is a flowchart of the fast-mirroring process.

As depicted in FIG. 25, the mirroring function is used to synchronize the contents of source [250] and target [252] servers. This is necessary when replication is first started, and again whenever replication is disabled while changes are being made to source server [250]. A fast-mirror mechanism is provided to expedite mirroring in the cases where file to be copied [261] already exists on target server [263]. This process is illustrated in FIG. 26. When fast-mirroring is used, Source Replication Manager [241] logically breaks the file [261] in to a number of blocks of a given size [264], and calculates a checksum for each block [267]. The source server [260] then requests the same information for the existing file [263] on target server [262]. The checksum of each block is compared [267,268], and only blocks that are different are transmitted to target server [262] via fast-mirror packets [266]. This significantly reduces the amount of network traffic required to effect mirroring, especially for larger files. A flowchart of the fast-mirroring process is shown in FIG. 27.

An example of fast-mirroring is shown in FIG. 26. The file FAST.DAT [261] is 4096 bytes long, and is broken into 8 logical blocks of 512 bytes each [267]. By comparing the checksum values for the file on the source [264] and target [265] servers, we see that only the second and fifth blocks have changed [267,268]. These two blocks [266] are transmitted to target server [262], where they will overwrite existing blocks [263]. In this case, only 1024 bytes are copied, versus 4096 bytes if normal mirroring was performed.

Several parameters that control fast-mirroring may be configured by user, in order to optimize server performance. Configurable parameters include: block size and minimum file size. Block size denotes the size of each logical block within the file, and is inversely proportional to the number of blocks that make up the file. A smaller block size would require more checksums to be calculated, but the resolution of each block would be higher. A small block size is optimal if changes were isolated to a small portion of a file, and if network resources are limited. A larger block size would require few checksums, with lower block resolution. If changes are spread throughout a file or computing resources are limited, a larger block size should be used.

Minimum file size denotes the minimum size a file must be to be considered for fastmirroring. Because of the computing and network resources required to calculate, transmit, and compare checksum values, this technique may only useful for larger files. Any files that are smaller than the user configured value for minimum size are copied using the standard mirroring process described above.

A further function of Source Replication Manager [241] is to handle configuration and status request messages from the workstation component. The following messages are supported:

Replication Set Modification—replication set messages denote which directories, files, and subdirectories are to be replicated by the source server. As the messages are received, the replication manager maintains an internal table of all replication set entries. If a directory, subdirectory, or file is added to this list after replication has begun, it will be automatically mirrored to target server.

Initiate Mirroring—requests that a specific source server begin mirroring its selected directories, subdirectories, and files to target server. This message is forwarded to Source Replication Manager for processing.

Source Server Statistics—requests statistical information about a specified source server. The Source Communications Manager places the requested information in a network message, which is returned to workstation component.

Figure 28:
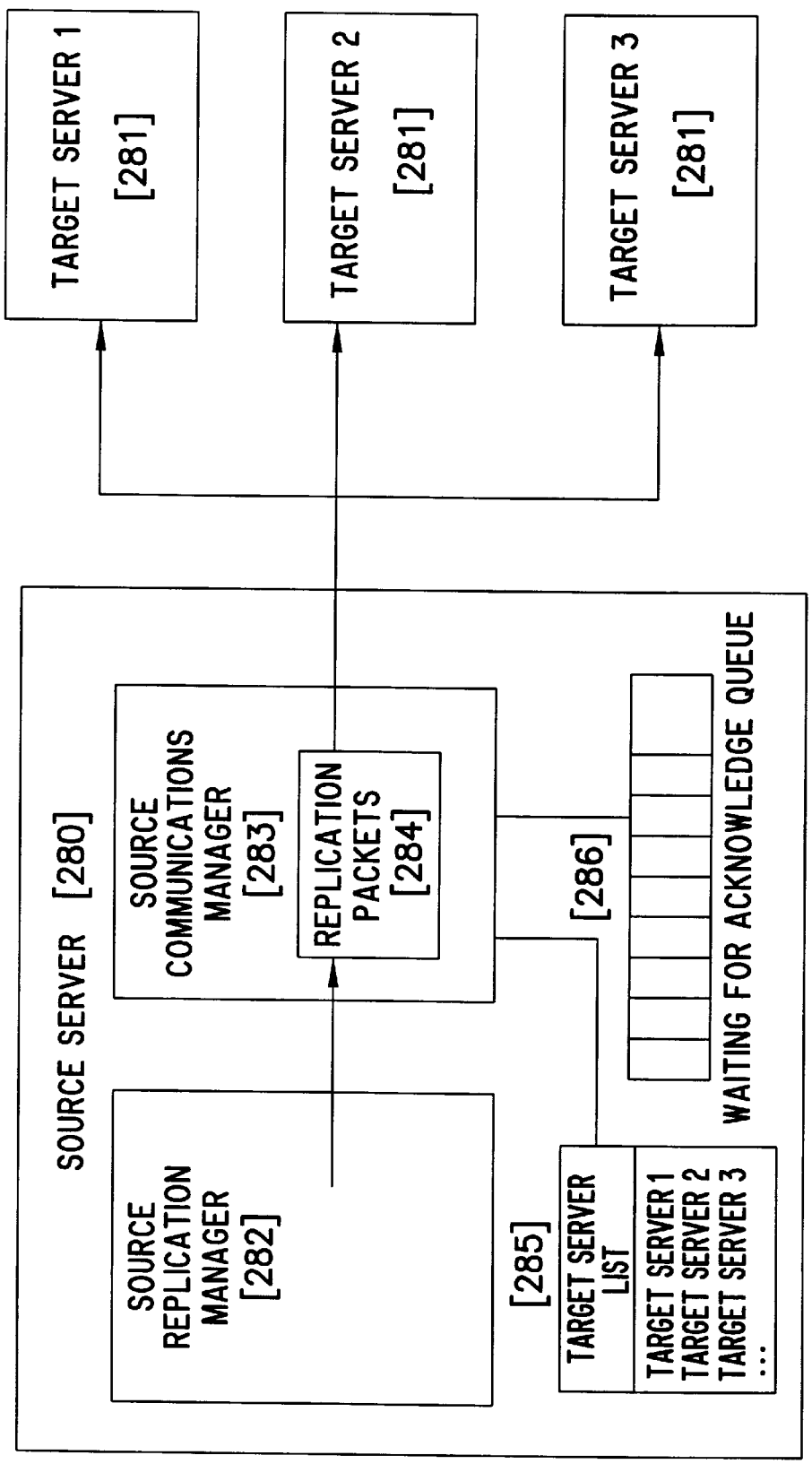
FIG. 28 illustrates operation of the Source Communication Manager (SCM) software component.

As depicted in FIG. 28, the primary function of Source Communications Manager [283] is to transmit replication packets [284] from source server [280] to one or more target servers [281]. When a packet [284] is received from Source Replication Manager [282], Source Communications Manager [283] first determines which target servers [281] are to receive this data [284]. Server configuration is stored internally in a target server list [285] on source server [280]. Source Communications Manager [283] then transmits the packet [283] to each configured target server [281], and places a copy of the packet on an internal "waiting for acknowledge" queue [286]. The copy of packet remains on this queue [286] until target server [281] responds that the [284] has been executed, or a time-out condition occurs. When one of these conditions is met, the status of the operation is returned to Source Replication Manager [282] and the packet [284] is removed from the queue [286].

If a time-out occurs, meaning target server [281] has not responded within a given period of time, Source Communications Manager [283] will attempt to resend the packet [284]. If target server [281] does not respond after a given number of retries, transaction [284] is removed from queue [286] and an error status message is returned to Source Replication Manager [282]. Whenever a packet [284] is removed from the "waiting for acknowledge" queue [286], Source Communications Manager [283] determines if there are any commands currently in stacked-up mode. If there are, the Source Replication Manager [282] is signaled to service the stacked-up mode queue with the available packet [284].

Figure 29:
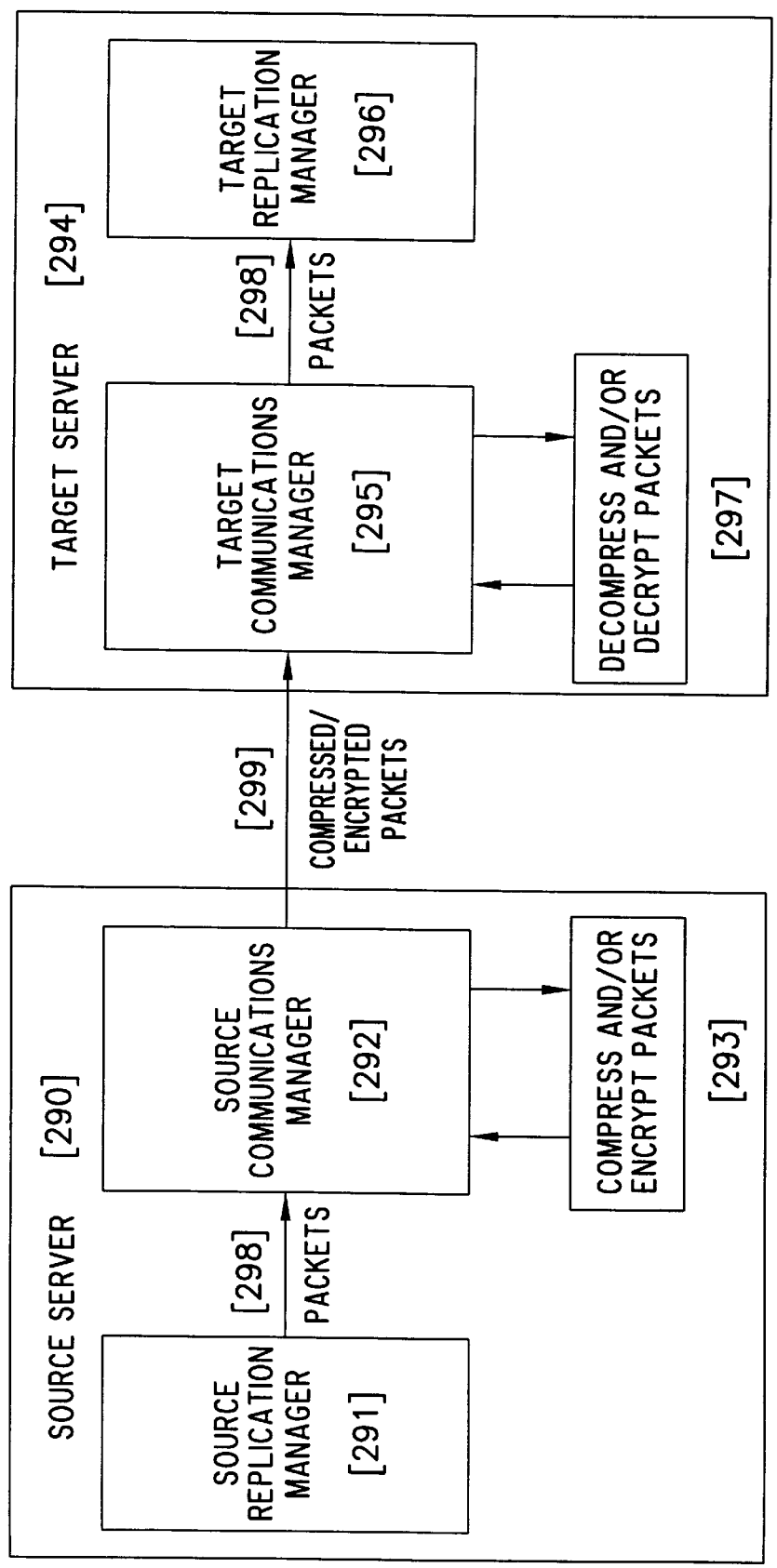
FIG. 29 illustrates the process of data compression/decompression and encryption decryption on source and target computers.

A further function of the Source Communications Manager [292] is to compress and/or encrypt replication data [298] before it is transmitted to the target server [294], using standard compression and encryption algorithms [293]. This process is shown in FIG. 29. Data compression and encryption [293] are optional features that may be enabled from the user workstation [336]. When compression and/or encryption are enabled, and a packet [298] is received by the Source Communications Manager [292], the packet data [298] is compressed and/or encrypted using standard methods [293]. The compressed/encrypted packet [299] is then transmitted to the target server [294], where it is decompressed and/or decrypted [297] before it is replicated.

Target Server Component

Figure 30:
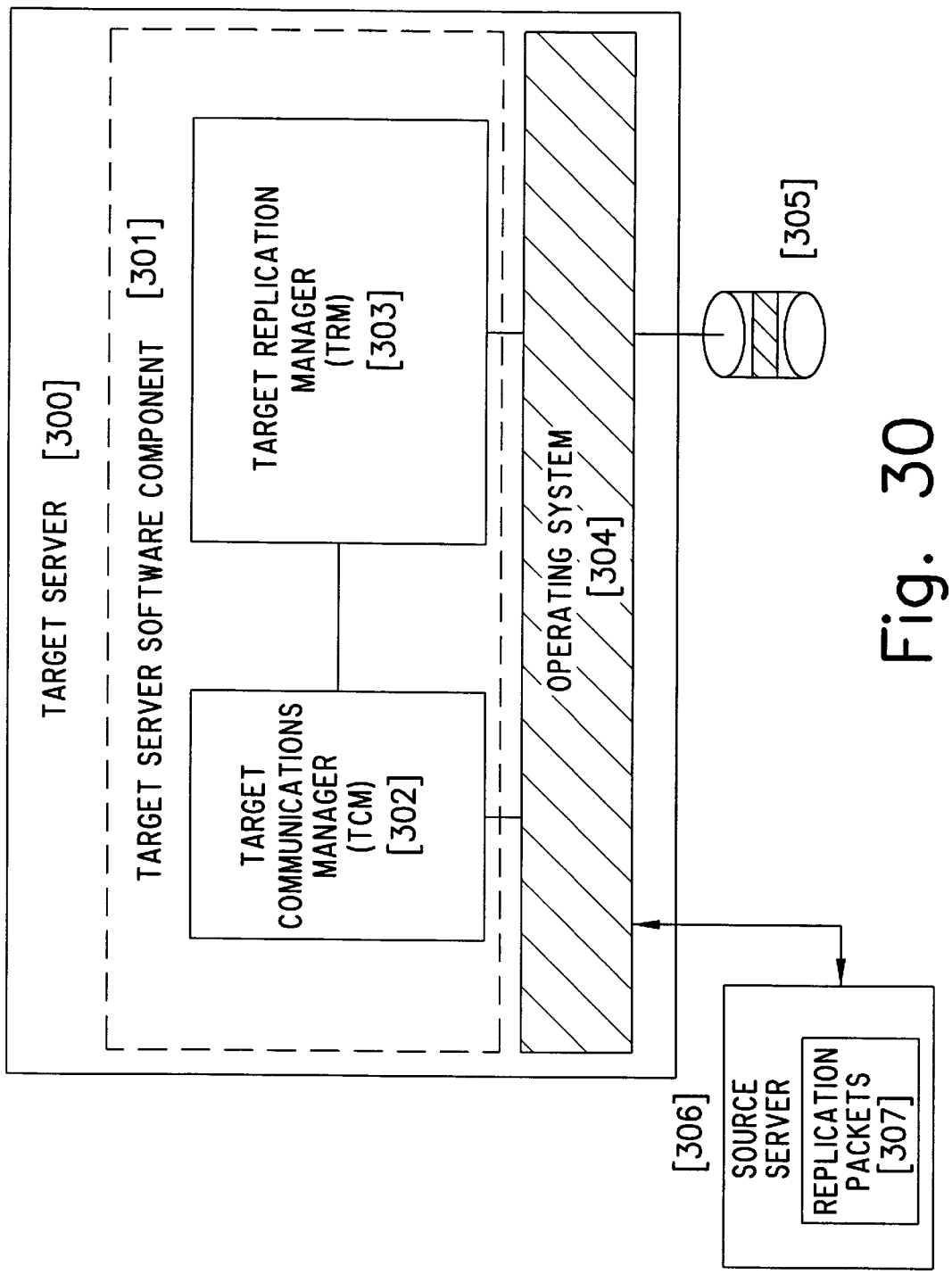
FIG. 30 is a block diagram of the target server software component.

The primary function of target server component [301] is to receive and execute replication packets [307] from one or more source servers [306]. A block diagram of target server [300] software components is shown in FIG. 30. The Target Communications Manager (TCM) [302] receives replication packets [307] from source server [306], and sends status messages back to source server [306] for each replication packet [306]. The Target Replication Manager (TRM) [303] replicates the operation described in each packet [307] to the local storage media [305] on target server [300], and restores data [305] to source server [306] when necessary.

The target server software component [301] is loaded on target server [300] at startup, and remains resident in memory until it is explicitly unloaded, or target computer [300] is powered off. A target server [300] must be connected to at least one source server [306] for replication to be performed. If a target server [300] is connected to multiple source servers [306], replication commands [307] may be forwarded from each.

The primary function of Target Communications Manager [302] on target server is to receive replication packets [307] from one or more source servers [306]. When a replication packet [307] is received from a source server [306], Target Communications Manager [302] forwards packet [307] to Target Replication Manager [303]. When Target Replication Manager [303] is finished processing the packet [307], Target Communications Manager [302] sends a status message to source server [306] in the form of another network packet.

Another function of Target Communications Manager is to handle the following user requests from workstation component:

Source Server Connect—requests that target server establish a connection with specified source server, and begin replication. The Target Communications Manager attempts to connect to specified source server, and returns a status message to workstation denoting the status of the connection.

Source Server Disconnect—requests that target server drop a connection with specified source server. The Target Communications Manager disconnects from specified source server, and returns a status message to workstation denoting the status of the connection.

Initiate Restore—requests that all replicated directories, subdirectories, and files for a specific source server be restored from target server. This request is forwarded to Target Replication Manager for processing.

Target Server Statistics—requests statistical information about target server. The communications manager places the requested information in a network message, which is returned to the workstation component.

A further function of the Target Communications Manager [295] is to decompress and/or decrypt replication data [299] that is transmitted from the source server [290], using standard decompression and decryption algorithms [297]. This process is shown in FIG. 29. Data compression and encryption [297] are optional features that may be enabled from the user workstation [336]. When compression and/or encryption are enabled and a packet [299] is received by the Target Communications Manager [295], the packet data [299] is decompressed and/or decrypted using standard methods [297]. The decompressed/decrypted packet [298] is then passed to the Target Replication Manager [296] for replication.

Figure 31:
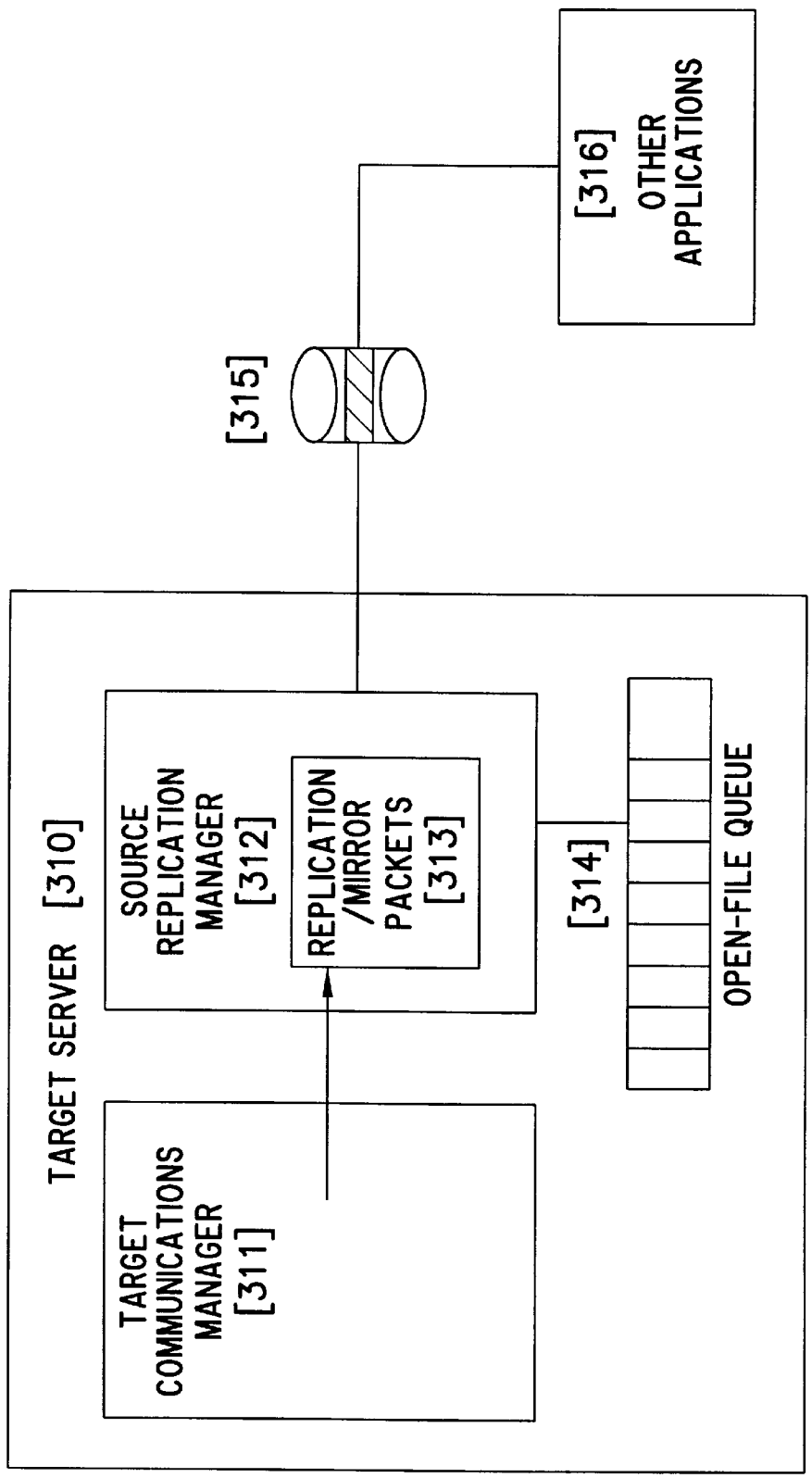
FIG. 31 illustrates operation of the Target Replication Manager (TRM).
Figure 32:
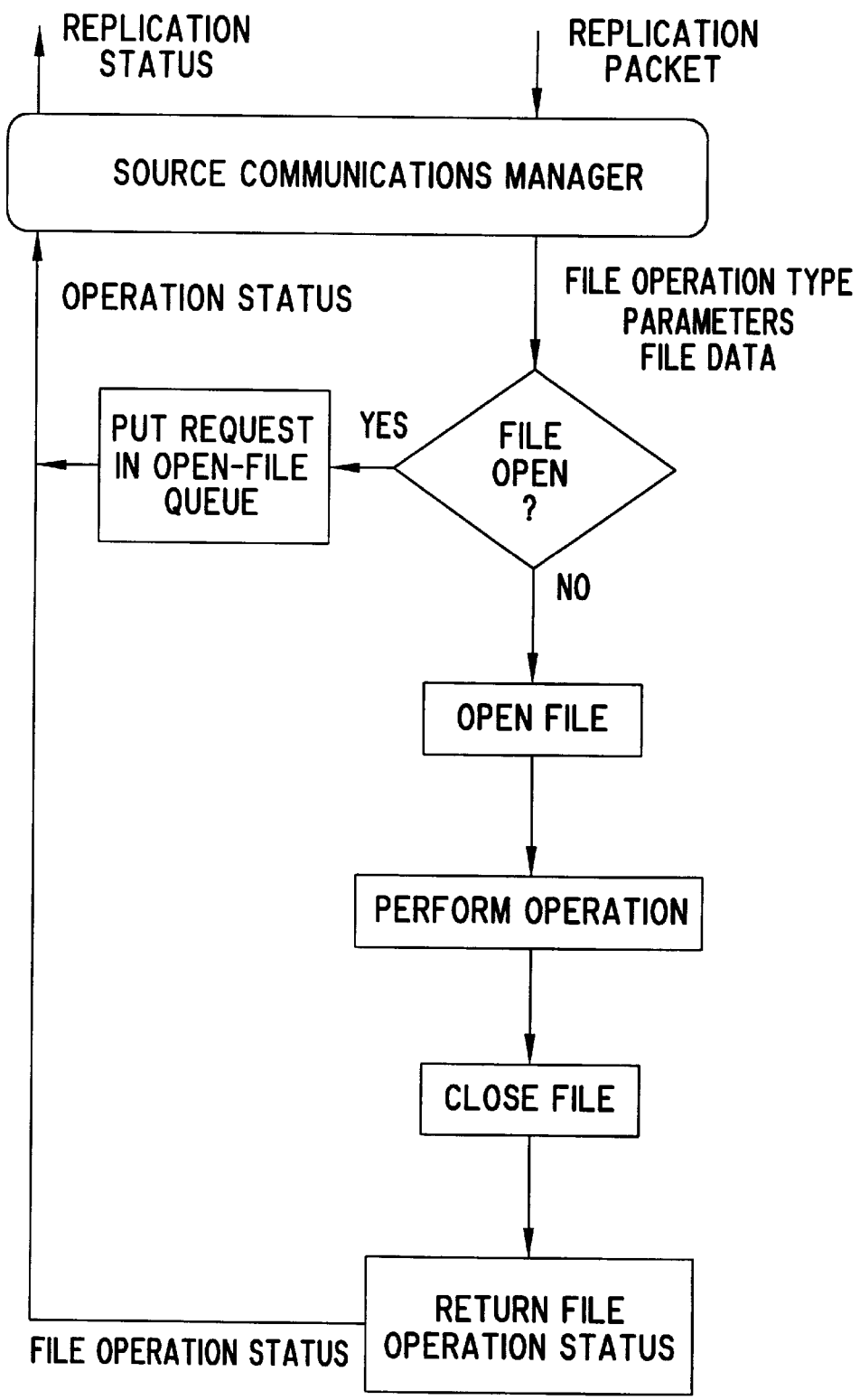
FIG. 32 is a flowchart representing the operation of the Target Replication Manager (TRM).

The primary function of Target Replication Manager [312] is to replicate the operation described in each packet [313] received by Target Communications Manager [311] to local storage media [315] on target server [310]. This process is shown in FIG. 31. The Target Replication Manager [312] parses each message to determine the type of command to be executed, the parameters required to execute the command, and the file data passed in packet [313]. Target Replication Manager [312] then determines if the file [315] specified in replication packet [313] is opened by another application [316] on target server [310]. If file [315] is in use by another application [316], the operation and all associated parameters and data is placed on an internal "open-file" queue [314]. A status message is returned to Target Communications Manager [311], denoting replication operation [313] is pending an open file [315]. A flowchart of this process is shown in FIG. 32.

If the associated file [315] is available and is successfully opened, specified file operation [313] is executed and file [315] is then closed. By closing file [315] immediately after operation is completed, file [315] is available for use by other applications [316] even if it remains open on source server [316]. The status of file operation [313] is then returned to Target Communications Manager [311], where it is in turn sent to source server [316] as a response.

The Target Replication Manager [312] periodically checks to see if any operations are waiting to be executed in open-file queue [314]. If file [315] associated with one or more entries in this queue [314] has since been closed, any such operations [314] are executed in the order they were received. Once an entry is executed, it is removed from open-file queue [314].

A further function of Target Replication Manager [312] is to handle mirror packets [313] from source server [316], via Target Communications Manager [311]. When a mirror packet [313] is received, Target Replication Manager [312] determines if associated file system item (user, directory, subdirectory, or file) [315] exists on target server [310]. The item [315] is created on target server [310] if it does not exist. In the case of a file request, the data associated with the request is written to file [315], at the offset specified in mirror packet [313]. The file [315] is then closed, so it may be accessed by other applications [316]. If file [315] specified by a mirror request [313] already exists, its contents are overwritten by new data [315].

Figure 33:
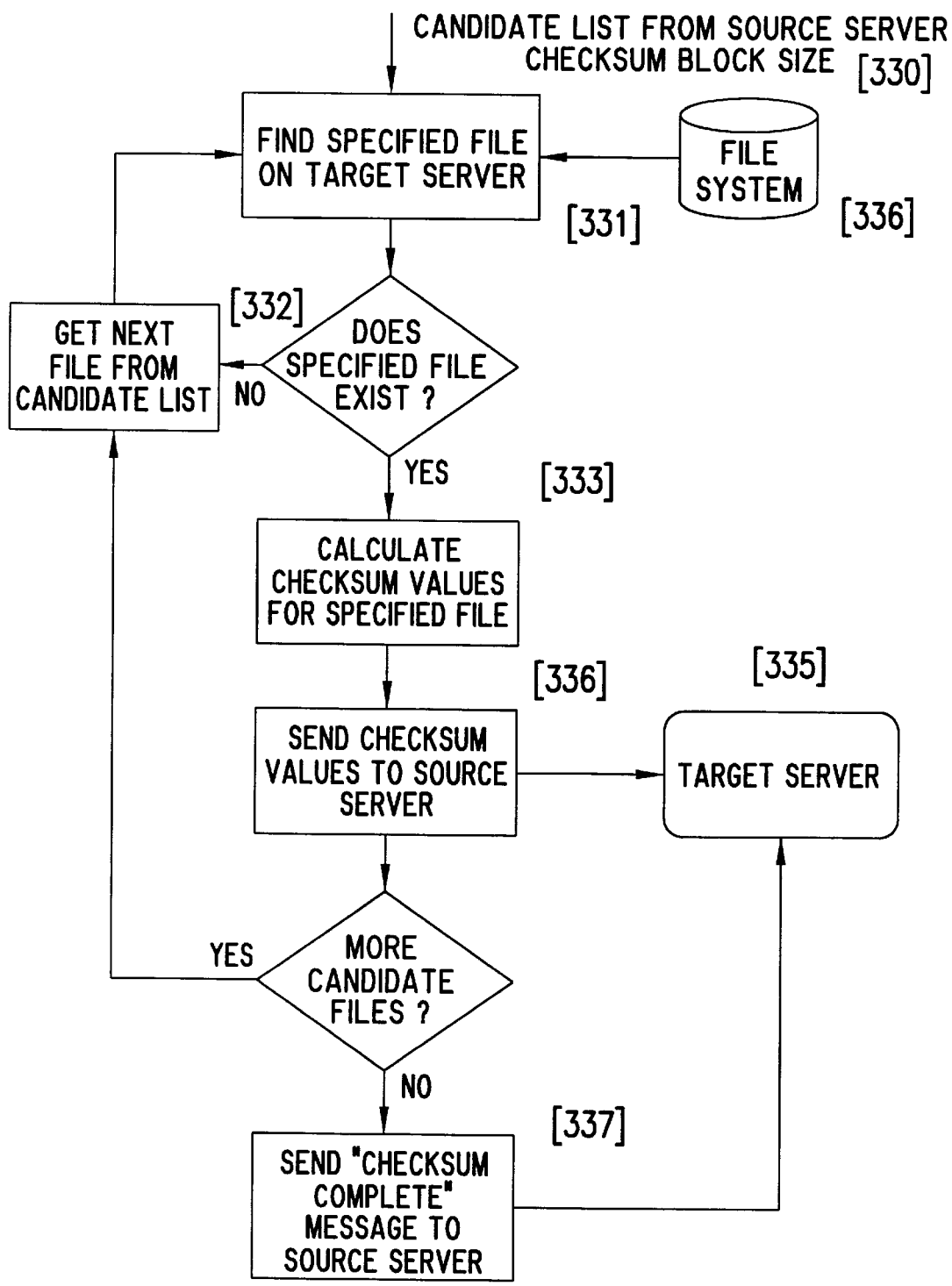
FIG. 33 is a flowchart representing the process of calculating checksum values on the target server.

In order to support fast-mirroring of larger files that already exist on both source [260] and target [262] servers, Target Replication Manager [312] must also calculate checksum values [265] for files [263] as requested by source server [260], as shown in FIG. 26. FIG. 33 illustrates how these checksum values [268] are calculated on the target server [262]. When fast mirroring is selected, source server [260] sends a list of all candidate files for fast mirroring, and the block size to be used in calculating checksum values [330]. The Target Replication Manager [312] searches the target server file system [336] for each file on this list [330] to see if it already exists [331]. If it does not exist on the target server [332], the specified file is dropped from the candidate list [330], and normal mirroring is performed for that file.

If a file in candidate list [330] does exist on target server file system [336], checksum values are calculated [333] using the specified block size [330]. These checksum values [333] are returned to source server [335] in the form of a network message [334]. The source server [335] is then responsible for comparing the checksum values [255] to those calculated on source server [254], and sending only those blocks [256] which are different. When all files on the candidate list [330] have been processed on the target server [262], a final message is sent to the source server [335] denoting that checksum calculation is complete [337].

Figure 34:
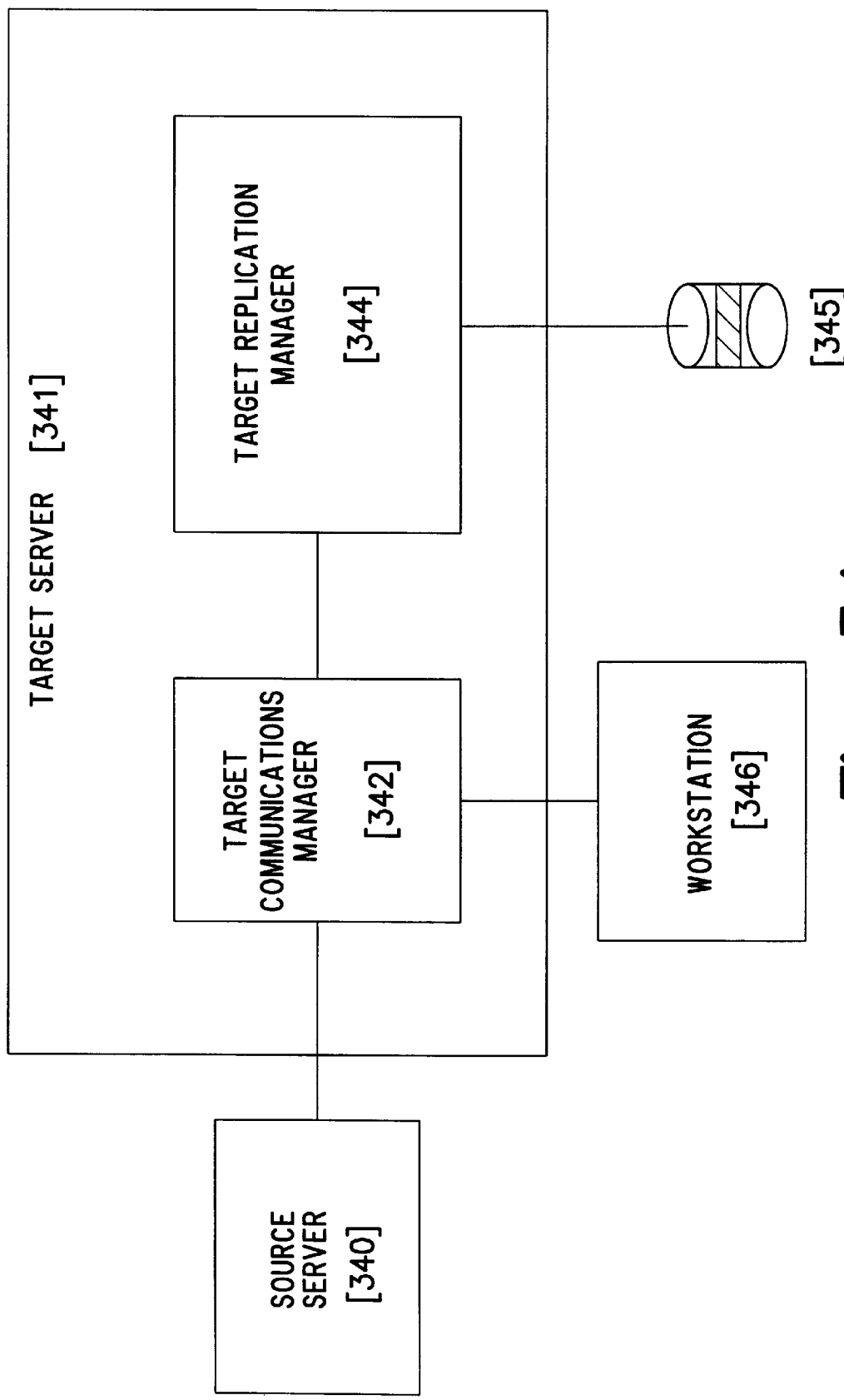
FIG. 34 illustrates the process of restoring data from target to source computer.

Another function of Target Replication Manager [344] is to restore replicated data [345] to a specified source server [340], as shown in FIG. 34. The restore request is sent from workstation [346] to Target Communications Manager [342], and is then forwarded to Target Replication Manager [344]. The Target Replication Manager [344] uses the mirroring technique described in source server [340] component section to effect such a restore, with source [340] and target [341] servers reversed. Both user account information and replicated data [345] are mirrored from target server [341] to source server [340].

Although the foregoing invention has been described in some detail by way of illustration and example for purposes of clarity of understanding, it will be obvious that certain changes and modifications may be practiced within the scope of the appended claims.

What we claim is:

1. A real time backup system comprising:
   at least one primary server for executing a file modification request, each primary server having a non-volatile storage media where the file modification request is saved;
   user means for communicating the file modification request to at least one primary server;
   at least one secondary server for executing the file modification request, each having a non-volatile storage media where the file modification is saved;
   first communication means for communicating the file modification request from the user means to the at least one primary server; and
   second communication means for communicating the file modification request from the at least one primary server to the at least one secondary server.

2. The system of claim 1, further comprising a backup storage device connected to the secondary server.

3. The system of claim 2, wherein the backup storage device is a tape.

4. The system of claim 1, further comprising a backup storage device connected to the primary server.

5. The system of claim 4, wherein the backup storage device is a tape.

6. The system of claim 1, wherein the non-volatile storage media of the at least one primary and secondary servers is a hard disk.

7. The system of claim 1, further comprising user means for communicating the file modification request to the secondary server.

8. The system of claim 1, wherein the logical designations for at least one of the at least one primary server and at least one of the at least one secondary server are referential of one physical server.

9. The system of claim 1, wherein the user means can initiate mirroring of the non-volatile storage media of the at least one primary server to the non-volatile storage media of the at least one secondary server.

10. The system of claim 1, wherein the user means can initiate mirroring of the non-volatile storage media of the at least one secondary server to the non-volatile storage media of the at least one primary server.

11. The system of claim 1, further comprising means for fast mirroring data from the at least one primary server to the at least one secondary server.

12. The system of claim 1, further comprising means for fast mirroring data from the at least one secondary server to the at least one primary server.

13. The system of claim 1, wherein the user means can access the at least one secondary server.

14. The system of claim 1, wherein the at least one primary server, further comprises means for placing file modification requests in an internal queue.

15. The system of claim 1, wherein the means for communicating between the at least one primary server with the at least one secondary server and the means for communicating between user means and the at least one primary server and the at least one secondary server are distinct and separate means.

16. The system of claim 1, wherein the first communication means and the second communication means are the same.

17. The system of claim 1, wherein the at least one primary server includes a first instance of an operating system and the at least one secondary server includes a second instance of an operating system.

18. The system of claim 17, wherein the first and second operating system are instances of the same operating system.

19. The system of claim 1, wherein the user means can select a portion of the file modification request for communication to the at least one secondary server.

20. A real time backup system comprising:
   at least one primary server for executing a file modification request, each primary server having a non-volatile storage media where the file modification request is saved;
   user means for communicating the file modification request to at least one primary server;
   at least one secondary server for executing the file modification request, each having a non-volatile storage media where the file modification is executed and saved;
   first communication means for communicating the file modification request from the user means to the at least one primary server;
   second communication means for communicating the file modification request from the at least one primary server to the at least one secondary server; and
   means to compress the file modification request.

21. A method of backing up a real time data system comprising the steps of:
   (a) replicating a non-volatile storage media of at least one primary server to a non-volatile storage media of at least one secondary server;

(b) sending a file modification request to the at least one primary server by a user;

(c) forwarding the file modification request from the primary server to the at least one secondary server for replication;

(d) executing the file modification request on the at least one secondary server;

(e) saving the file modification request to the non-volatile storage media of the at least one secondary server;

(f) executing the file modification request on the at least one primary server; and (g) saving the file modification request to the non-volatile storage media of the at least one primary server.

22. The method of claim 21, further comprising the step of compressing the file modification request before it is transmitted from the at least one primary server.

23. The method of claim 21, further comprising the step of encrypting the file modification request before it is transmitted from the at least one primary server.

24. A method of backing up a real time data system comprising the steps of:

(a) replicating a non-volatile storage media of at least one primary server to a non-volatile storage media of at least one secondary server;

(b) sending a file modification request to the at least one primary server by a user;

(c) forwarding the file modification request from the primary server to the at least one secondary server for replication;

(d) executing the file modification request on the at least one secondary server;

(e) saving the file modification request to the non-volatile storage media of the at least one secondary server;

(f) executing the file modification request on the at least one primary server;

(g) saving the file modification request to the non-volatile storage media of the at least one primary server;

(h) compressing the file modification request before it is transmitted from the at least one primary server; and (i) decompressing the file modification request on the at least one secondary server.

25. A method of backing up a real time data system comprising the steps of:

(a) replicating a non-volatile storage media of at least one primary server to a non-volatile storage media of at least one secondary server;

(b) sending a file modification request to the at least one primary server by a user;

(c) forwarding the file modification request from the primary server to the at least one secondary server for replication:

(d) executing the file modification request on the at least one secondary server;

(e) saving the file modification request to the non-volatile storage media of the at least one secondary server;

(f) executing the file modification request on the at least one primary server;

(g) saving the file modification request to the non-volatile storage media of the at least one primary server;

(h) encrypting the file modification request before it is transmitted from the at least one primary server; and (i) decrypting the file modification on the at least one secondary server.

26. A method of backing up a real time data system comprising the steps of:

(a) replicating a non-volatile storage media of at least one primary server to a non-volatile storage media of at least one secondary server;

(b) sending a file modification request to the at least one primary server by a user;

(c) executing the file modification request on the at least one primary server;

(d) saving the file modification request on the at least one primary server;

(e) forwarding the file modification request to the at least one secondary server;

(f) executing the file modification request on the at least one secondary server; and (g) saving the file modification request on the non-volatile storage media of the at least one secondary server.

27. The method of claim 26, further comprising the step of compressing the file modification request before it is transmitted from the at least one primary server.

28. The system of claim 26, further comprising the step of encrypting the file modification request before it is transmitted from the at least one primary server.

29. A method of backing up a real time data system comprising the steps of:

(a) replicating a non-volatile storage media of at least one primary server to a non-volatile storage media of at least one secondary server;

(b) sending a file modification request to the at least one primary server by a user;

(c) executing the file modification request on the at least one primary server;

(d) saving the file modification request on the at least one primary server;

(e) forwarding the file modification request to the at least one secondary server;

(f) executing the file modification request on the at least one secondary server;

(g) saving the file modification request on the non-volatile storage media of the at least one secondary server;

(h) compressing the file modification request before it is transmitted from the at least one primary server; and (i) decompressing the file modification request on the at least one secondary server.

30. A method of backing up a real time data system comprising the steps of:

(a) replicating a non-volatile storage media of at least one primary server to a non-volatile storage media of at least one secondary server;

(b) sending a file modification request to the at least one primary server by a user;

(c) executing the file modification request on the at least one primary server;

(d) saving the file modification request on the at least one primary server;

(e) forwarding the file modification request to the at least one secondary server;

(f) executing the file modification request on the at least one secondary server;

(g) saving the file modification request on the non-volatile storage media of the at least one secondary server;

(h) encrypting the file modification request before it is transmitted from the at least one primary server; and (i) decrypting the file modification request on the at least one secondary server.

31. A real time data backup system comprising:

user means for communicating at least one file system command to an operating system;

at least one primary server having a source server software component, the source server software component having monitoring means for monitoring the at least one file system command, replication means for replicating the at least one file system command and communication means for sending and receiving the at least one file system command; and at least one secondary server having a secondary server software component, the secondary server software component having replication means for replicating the at least one file system command and communication means for sending and receiving the at least one file system command to and from the communication means of the at least one primary server, the communication means of the at least one secondary server sending the at least one file system command to the replication means of the at least one secondary server.

32. The system of claim 31, wherein the communication means of the at least one primary server compresses the at least one file system command from the at least one primary server.

33. The system of claim 31, wherein the communication means of the at least one primary server encrypts the at least one file system command from the at least one primary server.

34. A real time data backup system comprising:

user means for communicating at least one file system command to an operating system:

at least one primary server having a source server software component, the source server software component having monitoring means for monitoring the at least one file system command, replication means for replicating the at least one file system command and communication means for sending and receiving the at least one file system command; and at least one secondary server having a secondary server software component, the secondary server software component having replication means for replicating the at least one file system command and communication means for sending and receiving the at least one file system command to and from the communication means of the at least one primary server, the communication means of the at least one secondary server sending the at least one file system command to the replication means of the at least one secondary server, wherein the communication means of the at least one primary server compresses the at least one file system command from the at least one primary server and the communication means of the at least one secondary server decompresses the at least one file system command.

35. A real time data backup system comprising:

user means for communicating at least one file system command to an operating system;

at least one primary server having a source server software component, the source server software component having monitoring means for monitoring the at least one file system command, replication means for replicating the at least one file system command and communication means for sending and receiving the at least one file system command; and at least one secondary server having a secondary server software component, the secondary server software component having replication means for replicating the at least one file system command and communication means for sending and receiving the at least one file system command to and from the communication means of the at least one primary server, the communication means of the at least one secondary server sending the at least one file system command to the replication means of the at least one secondary server, wherein the communication means of the at least one primary server encrypts the at least one file system command from the at least one primary server and the communication means of the at least one secondary server decrypts the at least one file system command.

\* \* \* \* \*